US010196049B2

(12) United States Patent
Nakaoka et al.

(10) Patent No.: US 10,196,049 B2
(45) Date of Patent: Feb. 5, 2019

(54) HYDRAULIC BRAKE SYSTEM

(71) Applicants: TOYOTA JIDOSHA KABUSHIKI KAISHA, Toyota-shi, Aichi (JP); ADVICS CO., LTD., Kariya, Aichi (JP)

(72) Inventors: Hiroshi Nakaoka, Okazaki (JP); Kiyoyuki Uchida, Kounan (JP); Masaki Maruyama, Nagoya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 0 days.

(21) Appl. No.: 15/535,673

(22) PCT Filed: Nov. 16, 2015

(86) PCT No.: PCT/JP2015/082079
§ 371 (c)(1),
(2) Date: Jun. 13, 2017

(87) PCT Pub. No.: WO2016/125365
PCT Pub. Date: Aug. 11, 2016

(65) Prior Publication Data
US 2018/0093652 A1 Apr. 5, 2018

(30) Foreign Application Priority Data
Feb. 6, 2015 (JP) .................. 2015-022206

(51) Int. Cl.
*B60T 8/32* (2006.01)
*B60T 8/18* (2006.01)
(Continued)

(52) U.S. Cl.
CPC .............. *B60T 8/1831* (2013.01); *B60T 8/17* (2013.01); *B60T 8/17555* (2013.01);
(Continued)

(58) Field of Classification Search
CPC ........ B60T 8/4081; B60T 8/36; B60T 8/3655; B60T 2230/04; B60T 13/147;
(Continued)

(56) References Cited

U.S. PATENT DOCUMENTS 4,844,122 A * 7/1989 Ichihashi ............ F16K 31/0606
137/625.27
5,184,773 A * 2/1993 Everingham ...... B60H 1/00485
137/115.25
(Continued)

FOREIGN PATENT DOCUMENTS

JP 2013-208987 A 10/2013

*Primary Examiner* — Bradley T King
*Assistant Examiner* — Mahbubur Rashid
(74) *Attorney, Agent, or Firm* — Oliff PLC

(57) ABSTRACT

A hydraulic brake system, including: a brake operation member; a brake device; a master cylinder; a communication switching valve; a low-pressure-source shut-off valve; a high-pressure source; a regulator; a pressure adjuster; and a controller, wherein, when a pressurizing state of the master cylinder is switched from a first pressurizing state to a second pressurizing state after initiation of an operation on the brake operation member, the controller executes a pressurizing-state switching control in which switching of a state of the low-pressure-source shut-off valve from an open state to a closed state and switching of a state of the communication switching valve from a closed state to an open state are carried out after a pressure-regulating state of the regulator has been switched from a first pressure-regulating state to a second pressure-regulating state by controlling the pressure adjuster to increase a second pilot pressure while the first pressurizing state is maintained.

6 Claims, 7 Drawing Sheets

(51) Int. Cl.
*B60T 8/17* (2006.01)
*B60T 13/74* (2006.01)
*B60T 15/36* (2006.01)
*B60T 8/1755* (2006.01)
*B60T 13/14* (2006.01)
*B60T 15/02* (2006.01)
*B60T 8/40* (2006.01)

(52) U.S. Cl.
CPC .......... *B60T 8/4077* (2013.01); *B60T 13/142* (2013.01); *B60T 13/74* (2013.01); *B60T 15/028* (2013.01); *B60T 15/36* (2013.01); *B60T 2270/60* (2013.01)

(58) Field of Classification Search
CPC .... B60T 8/1755; B60T 13/686; B60T 13/683; B60T 2270/402; B60T 11/224; B60T 8/367; B60T 15/027; B60T 8/3665; B60T 13/68; B60T 15/00; F16K 31/082; F16K 31/06; F16K 31/0675; F16K 31/084; F16K 27/029; F16K 31/0627; F16K 11/044; F16K 1/36
USPC ........................................................ 303/1.25
See application file for complete search history.

(56) References Cited

U.S. PATENT DOCUMENTS

| | | | | |
|---|---|---|---|---|
| 5,218,999 | A * | 6/1993 | Tanimoto | F16K 31/0627 137/625.65 |
| 5,860,709 | A * | 1/1999 | Hosoya | B60T 8/4872 303/116.1 |
| 6,662,581 | B2 * | 12/2003 | Hirota | F04B 27/1804 417/222.2 |
| 7,018,179 | B2 * | 3/2006 | Hirota | F04B 27/1804 417/222.2 |
| 7,121,811 | B2 * | 10/2006 | Hirota | F04B 27/1804 417/222.2 |
| 7,644,729 | B2 * | 1/2010 | Cho | F04B 27/1804 137/625.27 |
| 7,866,625 | B2 * | 1/2011 | Lee | B60T 8/363 251/129.15 |
| 8,348,230 | B2 * | 1/2013 | Michl | B60T 8/363 251/129.07 |
| 8,926,027 | B2 * | 1/2015 | Shimada | B60T 7/042 303/10 |
| 9,205,822 | B2 * | 12/2015 | Ueno | B60T 8/17 |
| 2004/0251441 | A1 * | 12/2004 | Schmitt | B60T 8/34 251/129.11 |
| 2008/0148686 | A1 * | 6/2008 | Voss | F16K 27/041 53/281 |
| 2008/0191156 | A1 * | 8/2008 | Shigeta | B60T 8/363 251/129.02 |
| 2009/0038697 | A1 * | 2/2009 | Cho | F25B 41/04 137/625.48 |
| 2010/0213758 | A1 * | 8/2010 | Nanahara | B60T 8/363 303/20 |
| 2012/0248354 | A1 * | 10/2012 | Takamatsu | B60T 8/367 251/129.02 |
| 2014/0008967 | A1 * | 1/2014 | Takeuchi | B60T 13/161 303/155 |
| 2014/0217809 | A1 * | 8/2014 | Koyama | B60T 13/146 303/6.01 |
| 2015/0102243 | A1 * | 4/2015 | Timmermans | F16K 27/029 251/129.07 |
| 2015/0107240 | A1 * | 4/2015 | Masuda | B60T 8/4077 60/537 |
| 2015/0120161 | A1 | 4/2015 | Kamiya et al. | |
| 2015/0274144 | A1 * | 10/2015 | Tokoi | B60T 7/042 303/3 |
| 2016/0207512 | A1 * | 7/2016 | Komaba | B60T 7/042 |
| 2016/0280191 | A1 * | 9/2016 | Okano | B60T 8/17 |
| 2016/0339889 | A1 * | 11/2016 | Okano | B60T 7/042 |
| 2016/0347297 | A1 * | 12/2016 | Ninoyu | B60T 8/17616 |
| 2016/0355168 | A1 * | 12/2016 | Ninoyu | B60T 8/4077 |

\* cited by examiner

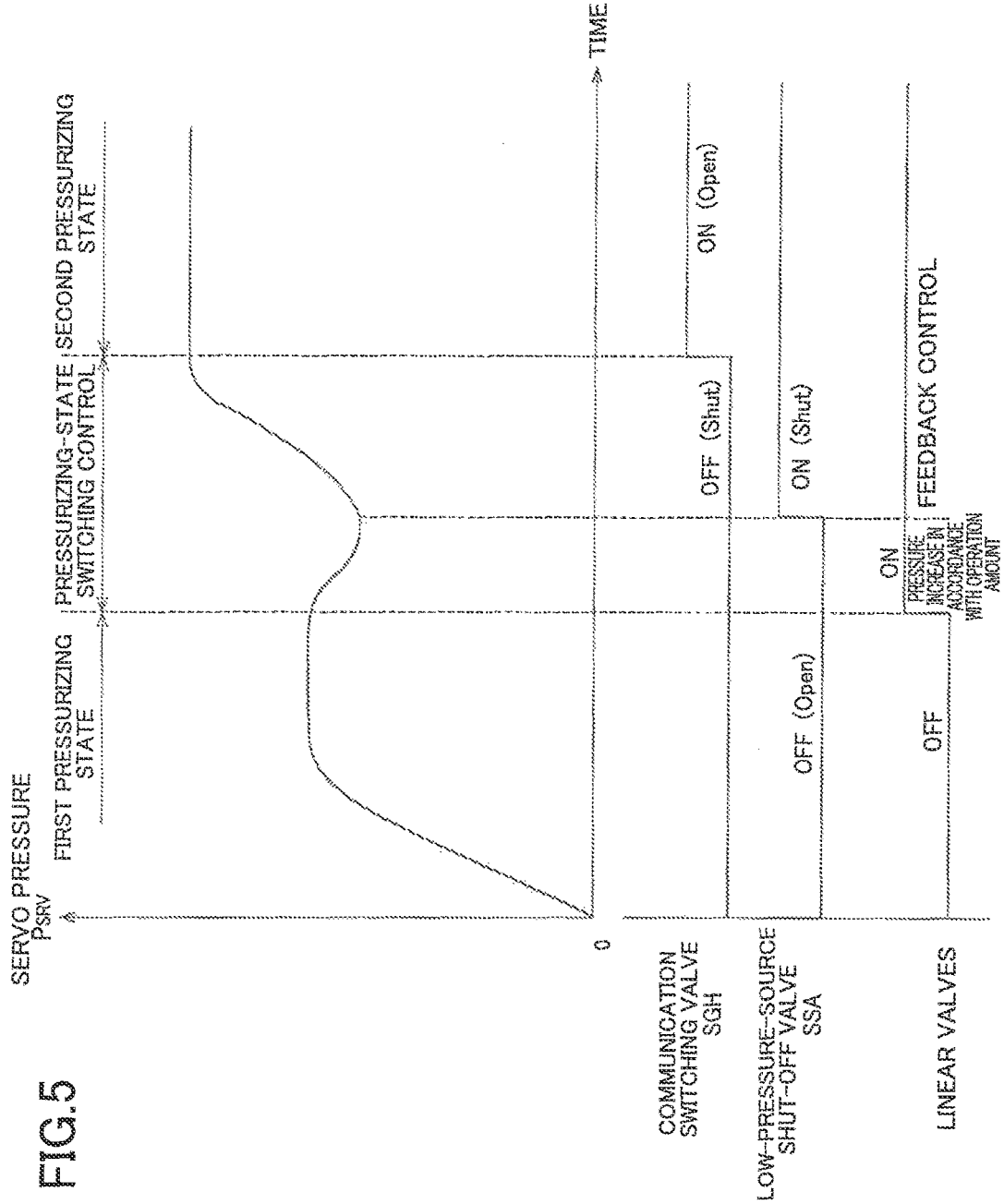

HYDRAULIC BRAKE SYSTEM

TECHNICAL FIELD

The present invention relates to a vehicle hydraulic brake system including a master cylinder and a regulator.

BACKGROUND ART

The following Patent Literature 1 describes a hydraulic brake system including a master cylinder configured to supply a pressurized working fluid to a brake device, a regulator configured to supply a pressure-regulated working fluid to the master cylinder, and a working-fluid supply device configured to supply, to the regulator, a working fluid having a pressure adjusted to a given level by control. The master cylinder includes (A-1) a housing including a partition portion which partitions an interior of the housing into two fluid chambers and which has an opening, (A-2) an input piston disposed in the housing so as to be located rearward of the partition portion and connected to a brake operation member so as to be moved forward by an operation of the brake operation member, (A-3) a pressurizing piston having a main body portion which is disposed in the housing so as to be located forward of the partition portion and which has a flange formed at a rear end thereof, (A-4) an inter-piston chamber defined between the input piston and the pressurizing piston utilizing the opening of the partition portion, (A-5) a pressurizing chamber which is defined forward of the pressurizing piston and in which the working fluid to be supplied to the brake device is pressurized by a forward movement of the pressurizing piston, (A-6) an input chamber which is defined between the flange of the pressurizing piston and the partition portion and to which is introduced the working fluid for giving the pressurizing piston a force that moves the pressurizing piston forward, and (A-7) an opposing chamber defined forward of the flange of the pressurizing piston so as to be opposed to the input chamber with the flange interposed therebetween.

The master cylinder is configured such that its pressurizing state is switched selectively between (I) a first pressurizing state in which the pressurizing piston is moved forward depending on both of a pressure of the working fluid in the inter-piston chamber and a pressure of the working fluid in the input chamber by shutting off communication between the inter-piston chamber and the opposing chamber with a communication switching valve placed in the closed state and by allowing communication between the opposing chamber and a low-pressure source with a low-pressure-source shut-off valve placed in the open state and (II) a second pressurizing state in which the pressurizing piston is moved forward depending on only the pressure of the working fluid in the input chamber by allowing the communication between the inter-piston chamber and the opposing chamber with the communication switching valve placed in the open state and by shutting off communication between: the inter-piston chamber and the opposing chamber; and the low-pressure source with the low-pressure-source shut-off valve placed in the closed state.

The regulator is configured to supply, to the input chamber of the master cylinder, the working fluid regulated in one of (I) a first pressure-regulating state in which a pilot piston comes into contact with a valve member and moves with the valve member by a first pilot pressure which is a pressure of the working fluid supplied from the pressurizing chamber of the master cylinder, so that the regulated pressure is regulated to a level in accordance with the first pilot pressure and (II) a second pressure-regulating state in which the valve member moves in a state in which the pilot piston is separated away from the valve member by a second pilot pressure which is a pressure of the working fluid supplied from a pressure adjuster, so that the regulated pressure is regulated to a level in accordance with the second pilot pressure.

CITATION LIST

Patent Literature

PATENT LITERATURE 1: JP-A-2013-208987

SUMMARY OF THE INVENTION

Technical Problem

In an instance where a controller of the hydraulic brake system constructed as described above starts to operate on the condition that a brake operation is made, for instance, the pressurizing state of the master cylinder is switched from the first pressurizing state to the second pressurizing state with the brake operation continued after initiation of the brake operation. When the pressurizing state is thus switched, a driver may have an unnatural feeling due to a change in an operation feeling or the like. In the system described in the Patent Literature 1, when the pressurizing state is switched, the communication switching valve is duty controlled with the low-pressure-source shut-off valve placed in the closed state so as to prevent or reduce a pressure change of the working fluid in the inter-piston chamber, thereby preventing or reducing a change of the operation feeling as felt by the driver. The present invention has been developed in view of the situations. It is therefore an object of the invention to reduce the defect caused when the pressurizing state is switched from the first pressurizing state to the second pressurizing state with the brake operation continued, as in the system of the Patent Literature 1.

Solution to Problem

To solve the problem, the hydraulic brake system of the present invention is configured such that, when the pressurizing state of the master cylinder is switched from the first pressurizing state to the second pressurizing state after initiation of the operation of the brake operation member, switching of the state of the low-pressure-source shut-off valve from the open state to the closed state and switching of the state of the communication switching valve from the closed state to the open state are carried out after the pressure-regulating state of the regulator has been changed from the first pressure-regulating state to the second pressure-regulating state by increasing the second pilot pressure by the pressure adjuster while the first pressurizing state is maintained.

Advantageous Effects of the Invention

In the hydraulic brake system according to the present invention, the second pilot pressure in the regulator starts to be controlled before the switching of the state of the low-pressure-source shut-off valve from the open state to the closed state and the switching of the state of the communication switching valve from the closed state to the open state are carried out, so as to increase a pressure of the working fluid in the input chamber. After the pressure of the working fluid in the input chamber has been increased to a given level, the switching of the state of the low-pressure-source shut-off valve and the switching of the state of the communication switching valve are carried out, making it possible to prevent or reduce a change of the operation feeling. For instance, before the inter-piston chamber and the opposing chamber are brought into communication with each other, the volume of the opposing chamber is reduced by a forward movement of the pressurizing piston caused by the increased pressure of the working fluid in the input chamber, so that it is possible to prevent or reduce a decrease in the pressure of the working fluid in the input chamber when the inter-piston chamber and the opposing chamber are brought into communication with each other. Thus, the brake system according to the present invention prevents or reduces a change of the operation feeling which would be otherwise caused when the pressurizing state of the master cylinder is switched from the first pressurizing state to the second pressurizing state after initiation of the operation of the brake operation member, thereby reducing the unnatural feeling given to the driver.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

In the following forms, the form (1) corresponds to claim 1. A form in which technical features of the form (2) are added to claim 1 corresponds to claim 2. A form in which technical features of the form (3) are added to claim 1 or 2 corresponds to claim 3. A form in which technical features of the form (4) are added to any one of claims 1-3 corresponds to claim 4. A form in which technical features of the form (5) are added to any one of claims 1-4 corresponds to claim 5. A form in which technical features of the form (6) are added to any one of claims 1-5 corresponds to claim 6.

(1) A hydraulic brake system, comprising:

a brake operation member to be operated by a driver;

a brake device provided for a wheel and configured to generate a braking force having a magnitude in accordance with a pressure of a working fluid supplied thereto;

a master cylinder including (A-1) a housing including a partition portion which partitions an interior of the housing into two fluid chambers and which has an opening, (A-2) an input piston disposed in the housing so as to be located rearward of the partition portion and connected to the brake operation member so as to be moved forward by an operation of the brake operation member, (A-3) a pressurizing piston having a main body portion which is disposed in the housing so as to be located forward of the partition portion and which has a flange formed at a rear end thereof, (A-4) an inter-piston chamber defined between the input piston and the pressurizing piston utilizing the opening of the partition portion, (A-5) a pressurizing chamber which is defined forward of the pressurizing piston and in which the working fluid to be supplied to the brake device is pressurized by a forward movement of the pressurizing piston, (A-6) an input chamber which is defined between the flange of the pressurizing piston and the partition portion and to which is introduced the working fluid for giving the pressurizing piston a force that moves the pressurizing piston forward, and (A-7) an opposing chamber defined forward of the flange of the pressurizing piston so as to be opposed to the input chamber with the flange interposed therebetween, a pressure receiving area of the pressurizing piston on which a pressure of the working fluid in the inter-piston chamber acts being made equal to a pressure receiving area of the pressurizing piston on which a pressure of the working fluid in the opposing chamber acts;

a communication passage which connects the inter-piston chamber and the opposing chamber to each other and to which a low-pressure source is connected;

a communication switching valve disposed at a portion of the communication passage nearer to the inter-piston chamber than a connected portion of the communication passage at which the low-pressure source is connected, a state of the communication switching valve being switched between an open state in which communication between the inter-piston chamber and the opposing chamber is allowed and a closed state in which the communication is shut off;

a low-pressure-source shut-off valve disposed between the communication passage and the low-pressure source, a state of the low-pressure-source shut-off valve being switched between an open state in which communication between the communication passage and the low-pressure source is allowed and a closed state in which the communication is shut off;

a stroke simulator disposed at a portion of the communication passage nearer to the opposing chamber than the connected portion and including a fluid chamber connected to the communication passage, the stroke simulator being configured to elastically pressurize the working fluid in the fluid chamber;

a high-pressure source configured to supply the working fluid having a high pressure;

a regulator configured to regulate, to a regulated pressure, a pressure of the working fluid having the high pressure supplied from the high-pressure source and to supply the pressure-regulated working fluid to the input chamber of the master cylinder, the regulator including (B-1) a regulated-pressure chamber in which the working fluid having the regulated pressure is stored, (B-2) a valve mechanism including a valve member which is movable in an axial direction of the regulator and which is configured to receive the pressure of the working fluid in the regulated-pressure chamber from one-end side of the regulator in the axial direction, the valve mechanism being configured such that, when the valve member is located at an end position in a movable range of the valve member, the end position being located on the other-end side of the regulator in the axial direction, communication between the low-pressure source and the regulated-pressure chamber is allowed while communication between the high-pressure source and the regulated-pressure chamber is shut off and such that, when the valve member moves forward toward the one-end side of the regulator in the axial direction, the communication between the low-pressure source and the regulated-pressure chamber is shut off while the communication between the high-pressure source and the regulated-pressure chamber is allowed, (B-3) a pilot piston disposed rearward of the valve member, (B-4) a first-pilot-pressure chamber which is defined rearward of the pilot piston and to which is introduced the working fluid pressurized in the pressurizing chamber of the master cylinder, and (B-5) a second-pilot-pressure chamber defined between the pilot piston and the valve member;

a pressure adjuster configured to adjust a pressure of the working fluid to a predetermined level by control and to supply the pressure-adjusted working fluid to the second-pilot-pressure chamber of the regulator; and a controller configured to control the communication switching valve and the low-pressure-source shut-off valve so as to switch the state of each of the communication switching valve and the low-pressure-source shut-off valve between the open state and the closed state and control the regulated pressure by controlling the pressure adjuster so as to adjust a second pilot pressure which is a pressure of the working fluid in the second-pilot-pressure chamber, wherein the controller is configured to control the pressure adjuster to adjust the second pilot pressure so as to switch a pressure-regulating state of the regulator from (I) a first pressure-regulating state in which the pilot piston comes into contact with the valve member and moves with the valve member by a first pilot pressure which is a pressure of the working fluid in the first-pilot-pressure chamber, so that the regulated pressure is regulated to a level in accordance with the first pilot pressure to (II) a second pressure-regulating state in which the valve member moves in a state in which the pilot piston is separated away from the valve member by the second pilot pressure, so that the regulated pressure is regulated to a level in accordance with the second pilot pressure, wherein the controller is configured to switch a pressurizing state of the master cylinder selectively between (I) a first pressurizing state in which the pressurizing piston moves forward depending on both of a pressure of the working fluid in the inter-piston chamber and a pressure of the working fluid in the input chamber by shutting off the communication between the inter-piston chamber and the opposing chamber with the communication switching valve placed in the closed state and by allowing communication between the opposing chamber and the low-pressure source with the low-pressure-source shut-off valve placed in the open state and (II) a second pressurizing state in which the pressurizing piston moves forward depending on only the pressure of the working fluid in the input chamber by allowing the communication between the inter-piston chamber and the opposing chamber with the communication switching valve placed in the open state and by shutting off communication between: the inter-piston chamber and the opposing chamber; and the low-pressure source with the low-pressure-source shut-off valve placed in the closed state, and wherein, when the pressurizing state of the master cylinder is switched from the first pressurizing state to the second pressurizing state after initiation of the operation of the brake operation member, the controller executes a pressurizing-state switching control in which switching of the state of the low-pressure-source shut-off valve from the open state to the closed state and switching of the state of the communication switching valve from the closed state to the open state are carried out after the pressure-regulating state of the regulator has been switched from the first pressure-regulating state to the second pressure-regulating state by controlling the pressure adjuster to increase the second pilot pressure while the first pressurizing state is maintained.

The hydraulic brake system of this form is based on a system including a master cylinder whose pressurizing state is switched selectively between (I) the first pressurizing state in which the pressurizing piston moves forward in dependence on both of the pressure of the working fluid in the inter-piston chamber and the pressure of the working fluid in the input chamber by shutting off the communication between the inter-piston chamber and the opposing chamber and by allowing the communication between the opposing chamber and the low-pressure source and (II) the second pressurizing state in which the pressurizing piston moves forward in dependence on only the pressure of the working fluid in the input chamber by allowing the communication between the inter-piston chamber and the opposing chamber and by shutting off the communication between the opposing chamber and the low-pressure source. When the pressurizing state is switched from the first pressurizing state to the second pressurizing state, the operation feeling of the brake operation member changes. Because the operation feeling in the first pressurizing state is determined by return springs and the like of the pressurizing piston and the operation feeling in the second pressurizing state is determined by the stroke simulator, the operation feeling changes when the first pressurizing state is switched to the second pressurizing state. That is, when the first pressurizing state is switched to the second pressurizing state, the operation feeling changes, whereby an operation amount of the brake operation member changes or a reaction force to the brake operation member abruptly changes.

In the second pressurizing state in which the pressurizing piston moves forward in dependence on only the fluid pressure in the input chamber, the fluid pressure in the input chamber for generating the same magnitude of the braking force under the same operation amount of the brake operation member is higher than in the first pressurizing state in which the pressurizing piston moves forward in dependence on both of the fluid pressure in the inter-piston chamber and the fluid pressure in the input chamber. In other words, when the first pressurizing state is switched to the second pressurizing state, the fluid pressure in the input chamber needs to be increased to a level higher than that in the first pressurizing state. In the brake system of this form, the second pilot pressure in the regulator starts to be controlled before the switching of the state of the low-pressure-source shut-off valve from the open state to the closed state and the switching of the state of the communication switching valve from the closed state to the open state are carried out, so as to increase the fluid pressure in the input chamber. Thereafter, the switching of the state of the low-pressure-source shut-off valve from the open state to the closed state and the switching of the state of the communication switching valve from the closed state to the open state are carried out in response to the increased fluid pressure in the input chamber, whereby the change of the operation feeling is prevented or reduced. For instance, before the inter-piston chamber and the opposing chamber are brought into communication with each other, the volume of the opposing chamber is reduced by a forward movement of the pressurizing piston caused by the increased fluid pressure in the input chamber, so that it is possible to prevent or reduce a decrease in the fluid pressure in the input chamber when the inter-piston chamber and the opposing chamber are brought into communication with each other. Thus, the brake system of this form more effectively reduces the unnatural feeling as felt by the driver when the pressurizing state of the master cylinder is switched from the first pressurizing state to the second pressurizing state after initiation of the brake operation member, as compared in an arrangement in which the starting of controlling the second pilot pressure in the regulator, the switching of the state of the low-pressure-source shut-off valve from the open state to the closed state, and the switching of the state of the communication switching valve from the closed state to the open state are simultaneously carried out.

In this form, the switching of the state of the low-pressure-source shut-off valve from the open state to the closed state and the switching of the state of the communication switching valve from the closed state to the open state may be sequentially carried out or may be simultaneously carried out.

(2) The hydraulic brake system according to the form (1), wherein the controller executes the pressurizing-state switching control such that the switching of the state of the low-pressure-source shut-off valve from the open state to the closed state is carried out after the pressure-regulating state of the regulator has been switched from the first pressure-regulating state to the second pressure-regulating state and thereafter the switching of the state of the communication switching valve from the closed state to the open state is carried out.

This form specifies an order in which the switching of the state of the low-pressure-source shut-off valve from the open state to the closed state and the switching of the state of the communication switching valve from the closed state to the open state are carried out. In this form, both of the low-pressure-source shut-off valve and the communication switching valve are once placed into the closed state after the pressure-regulating state of the regulator has been switched to the second pressure-regulating state. That is, the opposing chamber is hermetically closed. In this state, the fluid pressure in the input chamber increases with an increase in the regulated pressure, so that the fluid pressure in the opposing chamber also increases. This form reduces a difference in the fluid pressure between the two fluid chambers before the inter-piston chamber and the opposing chamber are brought into communication with each other, thereby preventing the fluid pressure in the inter-piston chamber from being decreased when the inter-piston chamber and the opposing chamber are brought into communication with each other. Thus, this form effectively prevents or reduces a change in the operation amount of the brake operation member or a change in the reaction force to the brake operation member due to the decrease in the fluid pressure in the inter-piston chamber, thereby reducing the unnatural feeling given to the driver.

(3) The hydraulic brake system according to the form (1) or (2), wherein the controller executes the pressurizing-state switching control such that, in an instance where the regulated pressure is decreased by a movement of the valve member toward the other-end side of the regulator based on a relationship of a force that acts on the valve member after the pilot piston has been separated away from the valve member by the increased second pilot pressure and the pressure of working fluid in the input chamber is accordingly decreased, the switching of the low-pressure-source shut-off valve from the open state to the closed state is carried out on the condition that the decrease of the fluid pressure in the input chamber stops.

This form specifies a condition under which the communication between the opposing chamber and the low-pressure source is shut off by the low-pressure-source shut-off valve. In an instance where the fluid pressure in the input chamber is decreased, the force that acts on the pressurizing piston so as to move the pressurizing piston forward is decreased, so that the pressurizing piston moves rearward. In an instance where the communication between the opposing chamber and the low-pressure source is shut off at the same time when the working fluid starts to be supplied to the second-pilot-pressure chamber by the pressure adjuster, for instance, the volume of the opposing chamber is increased by the rearward movement of the pressurizing piston, so that the fluid pressure in the opposing chamber is decreased. In this state, if the inter-piston chamber is brought into communication with the opposing chamber with the communication switching valve placed in the open state, a difference in the fluid pressure between the two fluid chambers becomes large and the change of the operation feeling accordingly becomes large. According to this form, the communication between the opposing chamber and the low-pressure source is shut off after the fluid pressure in the input chamber has substantially or entirely stopped decreasing, whereby it is possible to avoid a decrease in the fluid pressure in the opposing chamber. The wording "the decrease of the fluid pressure stops" in this form means a case in which the decrease amount of the fluid pressure becomes smaller than a set value, a case in which the change in the fluid pressure becomes zero, a case in which the fluid pressure starts to increase, or the like.

(4) The hydraulic brake system according to any one of the forms (1) through (3), wherein the controller is configured such that, when the pressurizing state of the master cylinder is switched to the second pressurizing state, the second pilot pressure is feedback controlled based on a difference between an actual fluid pressure in the input chamber and a target fluid pressure in the input chamber determined in accordance with the operation of the brake operation member, and wherein the controller executes the pressurizing-state switching control such that the switching of the state of the communication switching valve from the closed state to the open state is carried out on the condition that the actual fluid pressure in the input chamber reaches the target fluid pressure.

This form specifies a condition under which the communication between the inter-piston chamber and the opposing chamber is allowed. According to this form, before the inter-piston chamber and the opposing chamber are brought into communication with each other, the fluid pressure in the input chamber is increased to a level to be attained in the second pressurizing state. In other words, the volume of the opposing chamber is made sufficiently small, making it possible to more effectively prevent or reduce a decrease in the fluid pressure in the input chamber caused when the inter-piston chamber and the opposing chamber are brought into communication with each other.

(5) The hydraulic brake system according to any one of the forms (1) through (4), wherein, in a situation in which an operation to decrease the braking force has been made on the brake operation member, the controller starts to increase the second pilot pressure by controlling the pressure adjuster while the first pressurizing state is maintained, so as to start execution of the pressurizing-state switching control.

This form specifies a condition under which the switching of the pressurizing state from the first pressurizing state to the second pressurizing state starts. In this form, the first pressurizing state is switched to the second pressurizing state at timing when the vehicle starts to run by decreasing the braking force. In this form, it is determined that the vehicle is currently in "a situation in which an operation to decrease the braking force has been made on the brake operation member" when a sensor for detecting the operation amount of the brake operation member detects a decrease in the operation amount. It may be determined that the vehicle is currently in the situation when a sensor for detecting a vehicle speed detects a speed not lower than a set value (e.g., 0.5-1.0 km/h) and the vehicle starts to run or when a sensor for detecting the fluid pressure in the input chamber detects that the fluid pressure in the input chamber starts to decrease.

According to this form, the first pressurizing state is switched to the second pressurizing state at timing when the driver returns the brake operation member to its non-operated position, so that the driver is less likely to feel a change of the operation feeling which results from the switching of the pressurizing state from the first pressurizing state to the second pressurizing state. Especially when the fluid pressure in the input chamber is decreased and the pressurizing piston is accordingly moved rearward, the input piston receives a force by which the input piston is also moved rearward. The force received by the input piston is a force in a direction in which the brake operation member is returned to its non-operated position, so that the unnatural feeling given to the driver is reduced by the force.

(6) The hydraulic brake system according to any one of the forms (1) through (5), wherein the regulator is constructed such that a pressure receiving area of the valve member at which the second pilot pressure is received from a rear side is made smaller than a pressure receiving area of the pilot piston at which the second pilot pressure is received from a front side.

This form limits the structure of the regulator. In this form, a force that moves the pilot piston rearward by the second pilot pressure is larger than a force that moves the valve member forward by the second pilot pressure. In this case, the pilot piston moves away from the valve member in a state in which the force that moves the valve member forward by the second pilot pressure is smaller than a force that moves the valve member rearward by the regulated pressure, so that the regulated pressure is decreased. This form is effective when combined with the form described above in which the state of the low-pressure-source shut-off valve is switched from the open state to the closed state on the condition that the decrease of the fluid pressure in the input chamber stops.

(7) The hydraulic brake system according to any one of the forms (1) through (6), wherein the regulator is constructed such that a pressure receiving area of the valve member at which the regulated pressure is received from a front side is made smaller than a pressure receiving area of the pilot piston at which the first pilot pressure is received from a rear side.

This form limits the structure of the regulator. In this form, the pressure receiving area of the valve member on which the regulated pressure acts is made comparatively small. That is, this form allows the valve member to have a comparatively small size. In an instance where the valve mechanism is a spool valve mechanism, a clearance between: a spool as the valve member; and a holder holding the spool is narrowed so as to prevent leakage of the working fluid. Thus, this form that allows the valve member to have a comparatively small size effectively prevents leakage of the working fluid, as compared with an arrangement in which the valve member has a large size. In this form, the pressure receiving area of the pilot piston by which the first pilot pressure is received is made comparatively large, whereby the pilot pressure required for moving the valve member forward in the first state can be made comparatively small.

(8) The hydraulic brake system according to the form (7), wherein the regulated-pressure chamber located on one of opposite sides of the valve member that is nearer to the one-end side of the regulator is defined as a first regulated-pressure chamber, wherein the regulator includes a second regulated-pressure chamber which communicates with the first regulated-pressure chamber and to which is introduced the working fluid for giving the pilot piston a force that moves the pilot piston rearward, wherein the regulator placed in the first pressure-regulating state regulates a pressure of the working fluid in the first regulated-pressure chamber and the second regulated-pressure chamber by the first pilot pressure that is received by a portion of the pilot piston located on the rear side in a state in which a portion of the pilot piston located on the front side and a portion of the valve member located on the rear side are held in contact with each other, and wherein the regulator placed in the second pressure-regulating state regulates a pressure of the working fluid in the first regulated-pressure chamber by the second pilot pressure that is received by the portion of the valve member located on the rear side in a state in which the pilot piston and the valve member are separated away from each other.

This form is configured such that the regulated pressure also acts on the pilot piston in the form indicated above wherein the pressure receiving area of the valve member, by which the regulated pressure is received, is made small. This form allows a reduction or a substantial elimination of a difference between: a first-pilot-pressure receiving area of the pilot piston and the valve member which move together in the first pressurizing state; and a regulated-pressure receiving area thereof. Even though the regulator is configured such that the pressure receiving area of the valve member by which the regulated pressure is received is made smaller than the pressure receiving area of the pilot piston by which the first pilot pressure is received, a difference between the first pilot pressure and the regulated pressure can be made small or the first pilot pressure and the regulated pressure can be made substantially equal to each other in this form.

BRIEF DESCRIPTION OF THE DRAWINGS

FIG. 5 is a time chart showing temporal changes in a servo pressure and supply currents to a communication switching valve, a low-pressure-source shut-off valve, and pressure-increase and pressure-decrease linear valves when a pressurizing state of a master cylinder is switched from a first pressurizing state to a second pressurizing state.

DETAILED DESCRIPTION OF THE EMBODIMENT

Figure 1:
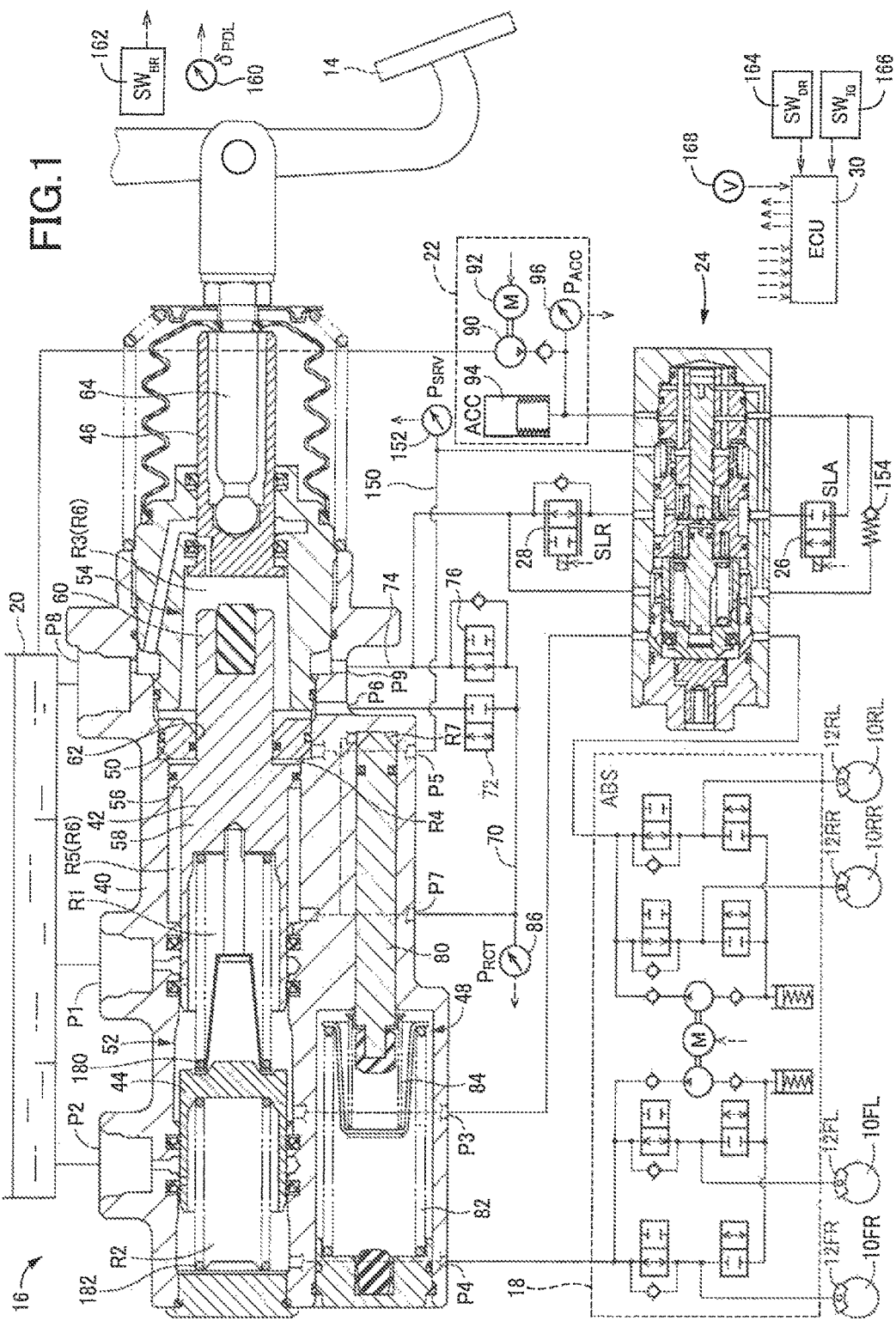
FIG. 1 schematically shows a vehicle on which is installed a hydraulic brake system according to one embodiment of the claimable invention.

Referring to the drawings, there will be explained below in detail one embodiment of the claimable invention. It is to be understood that the claimable invention is not limited to the details of the following embodiment and the forms described in Forms of the Invention, but may be changed and modified based on the knowledge of those skilled in the art. It is to be further understood that modifications of the following embodiment can be provided utilizing technical features described in the Forms of the Invention.

Embodiment

Structure of Hydraulic Brake System
(a) Overall Structure

A vehicle hydraulic brake system according to one embodiment of the claimable invention is installed on hybrid vehicles, and a brake oil is used as a working fluid. As shown in FIG. 1, the present hydraulic brake system generally includes (a) four brake devices 12 which are provided for respective four wheels 10 and each of which is configured to generate a braking force, (b) a master cylinder 16 to which is input an operation of a brake pedal 14 as a brake operation member and which is configured to supply a pressurized working fluid to each brake device 12, (c) an anti-lock unit 18 [ABS] disposed between the master cylinder 16 and the four brake devices 12, (d) a high-pressure-source device 22 configured to pump up the working fluid from a reservoir 20 as a low-pressure source and to pressurize the pumped fluid, so as to supply the working fluid that is highly pressurized, (e) a regulator 24 configured to regulate a pressure of the working fluid supplied from the high-pressure-source device 22 and to supply the pressure-regulated working fluid to the master cylinder 16, (f) an electromagnetic pressure-increase linear valve [SLA] 26 and an electromagnetic pressure-decrease linear valve [SLR] 28 for adjusting a pressure of the working fluid to be supplied to the regulator 24, and (g) an electronic brake control unit [ECU] 30, as a controller, configured to control the hydraulic brake system by controlling the devices, equipment, valves and so on. Where it is necessary to distinguish the four wheels 10 in terms of "front", "rear", "right", and "left", the four wheels 10 are indicated as a front right wheel 10FR, a front left wheel 10FL, a rear right wheel 10RR, and a rear left wheel 10RL, respectively. Where it is necessary to similarly distinguish constituent elements, the same affixes as used for the wheels 10 are used. For instance, the four brake devices 12 are indicated as 12FR, 12FL, 12RR, and 12RL, respectively, if necessary. In the following explanation, characters enclosed with square brackets [ ] represent signs used in the drawings.
(b) Brake Device and ABS Unit Each of the brake devices 12 which are provided for the respective wheels 10 is a disc brake device including a disc rotor that rotates with the wheel 10, a caliper held by a carrier, a wheel cylinder held by the caliper, and brake pads held by the caliper and configured to be moved by the wheel cylinder, so as to sandwich the disc rotor. The ABS Unit 18 is a unit constituted by four pairs of a pressure-increase open/close valve and a pressure-decrease open/close valve which correspond to the respective four wheels, a pump device, and so on. The ABS Unit 18 is configured to be activated when the wheels 10 are locked due to skidding or the like, so as to prevent the locking of the wheels 10 from being continued.
(c) Master Cylinder
i) Structure of Master Cylinder The master cylinder 16 is a master cylinder in which a stroke simulator is integrally incorporated. In general, the master cylinder 16 has a housing 40 in which two pressurizing pistons, i.e., a first pressurizing piston 42 and a second pressurizing piston 44, and an input piston 46 are housed, and a stroke simulator mechanism 48 is incorporated in the housing 40. In the following explanation about the master cylinder 16, a leftward direction and a rightward direction in FIG. 1 are respectively referred to as a forward direction and a rearward direction for the sake of convenience. Likewise, a leftward movement and a rightward movement of the pistons, etc., explained below are respectively referred to as a forward or advancing movement and a rearward or retracting movement.

The housing 40 has a space in which the first pressurizing piston 42, the second pressurizing piston 44, and the input piston 46 are disposed. The space is closed at its front-side end and is partitioned by an annular partition portion 50 into a front-side chamber 52 and a rear-side chamber 54. The second pressurizing piston 44 has a cylindrical shape which is open on its front side and closed on its rear side. The second pressurizing piston 44 is disposed at a front-side portion of the front-side chamber 52. The first pressurizing piston 42 has a cylindrical shape having a closed end. The first pressurizing piston 42 includes: a main body portion 58 having a flange 56 formed at its rear end; and a protruding portion 60 that extends rearward from the main body portion 58. The main body portion 58 is disposed in the front-side chamber 52 so as to be located rearward of the second pressurizing piston 44. The annular partition portion 50 has an opening 62 formed at its central portion, and the protruding portion 60 extends into the rear-side chamber 54 through the opening 62. The input piston 46 is disposed in the rear-side chamber 54 such that the input piston 46 partially extends into the rear-side chamber 54 from the rear side. The brake pedal 14 disposed on the rear side of the input piston 46 is connected to the input piston 46 via a link rod 64.

A first pressurizing chamber R1 is formed between the first pressurizing piston 42 and the second pressurizing piston 44, more specifically, on the front side of the main body portion 58 of the first pressurizing piston 42. In the first pressurizing chamber R1, the working fluid to be supplied to the two brake devices 12RR, 12RL corresponding to the respective two rear wheels 10RR, 10RL is pressurized by a forward movement of the first pressurizing piston 42. Further, a second pressurizing chamber R2 is formed on the front side of the second pressurizing piston 44. In the second pressurizing chamber R2, the working fluid to be supplied to the two brake devices 12FR, 12FL corresponding to the respective front wheels 10FR, 10FL is pressurized by a forward movement of the second pressurizing piston 44. Further, an inter-piston chamber R3 is formed between the first pressurizing piston 42 and the input piston 46. More specifically, the inter-piston chamber R3 is formed such that a rear end of the protruding portion 60 that extends rearward from the opening 62 formed in the partition portion 50 and a front end of the input piston 46 face to each other, namely, such that the first pressurizing piston 42 and the input piston 46 face to each other utilizing the opening 62. Further, in the front-side chamber 52 of the housing 40, there are formed: an annular input chamber R4 to which the working fluid supplied from the regulator 24 is introduced; and an annular opposing chamber R5. The input chamber R4 is formed around an outer circumference of the protruding portion 60 so as to be defined by a front end face of the partition portion 50 and a rear end face of the main body portion 58 of the first pressurizing piston 42, i.e., a rear end face of the flange 56. The opposing chamber R5 is formed forward of the flange 56 around an outer circumference of the main body portion 58 such that the opposing chamber R5 is opposed to the input chamber R46 with the flange 56 interposed therebetween.

The first pressurizing chamber R1 is fluidly communicable with the reservoir 20 via an atmospheric-pressure port P1 when the first pressurizing piston 42 is located at a rear end position in its movement range while the second pressurizing chamber R2 is fluidly communicable with the reservoir 20 via an atmospheric-pressure port P2 when the second pressurizing piston 44 is located at a rear end position in its movement range. The first pressurizing chamber R1 and the second pressurizing chamber R2 communicate with the brake devices 12 via respective output ports P3, P4 and via the ABS unit 18. In this respect, the first pressurizing chamber R1 communicates with the brake devices 12RR, 12RL also via the regulator 24 (which will be explained). Further, the input chamber R4 communicates with a regulated-pressure port (which will be explained) of the regulator 24 via an input port P5.

The inter-piston chamber R3 communicates with a communication port P6 while the opposing chamber R5 communicates with a communication port P7. The communication port P6 and the communication port P7 are connected by a communication passage 70 as an external communication passage. At a certain position in the communication passage 70, there is provided a normally-closed electromagnetic open/close valve 72, namely, an open/close valve 72 configured to be closed in a non-energized state and opened in an energized state. When the open/close valve 72 in placed in an open state, the inter-piston chamber R3 and the opposing chamber R5 are brought into communication with each other. In a state in which the inter-piston chamber R3 and the opposing chamber R5 are held in communication with each other, the chambers R3 and R5 define one fluid chamber. That is, a fluid chamber that may be referred to as a reaction-force chamber R6 is defined. The open/close valve 72 has a function of switching a communication state of the inter-piston chamber R3 and the opposing chamber R5 between a communicating state and a non-communicating state. In view of this, the open/close valve 72 will be hereinafter referred to as "communication switching valve 72".

The master cylinder 16 has two more atmospheric-pressure ports P8, P9 which communicate with each other via an internal passage. The atmospheric-pressure port P8 is connected to the reservoir 20 while the atmospheric-pressure port P9 is connected, between the communication switching valve 72 and the opposing chamber R5, to the communication passage 70 via a low-pressure passage 74 as an external communication passage. In the low-pressure passage 74, there is provided a normally-opened electromagnetic open/close valve 76, namely, an open/close valve 76 configured to be opened in a non-energized state and closed in an energized state. The open/close valve 76 has a function of shutting off a communication between the opposing chamber R5 and the reservoir 20. In view of this, the open/close valve 76 will be hereinafter referred to as "low-pressure-source shut-off valve 76".

The housing 40 has a space different from the space in which the first pressurizing piston 42, the second pressurizing piston 44, and the input piston 46 are disposed. The stroke simulator mechanism 48 is constituted by the space in question, a reaction-force piston 80 disposed in the space, and two reaction-force springs 82, 84 (both of which are compression coil springs) for biasing the reaction-force piston 80. On the rear side of the reaction-force piston 80, a buffer chamber R7 is formed. (In FIG. 1, the buffer chamber R7 is illustrated in an almost deflated or compression state.) When the input piston 46 moves forward by an operation of the brake pedal 14, the working fluid in the opposing chamber R5, namely, the working fluid in the reaction-force chamber R6, is introduced into the buffer chamber R7 via an inner passage, and elastic reaction forces of the reaction-force springs 82, 84 in accordance with the amount of the introduced working fluid, namely, in accordance with the forward movement of the input piston 46, act on the reaction-force chamber R6, whereby an operation reaction force is applied to the brake pedal 14. In the present system, there is provided, in the communication passage 70, a reaction-force pressure sensor $[P_{RCT}]$ 86 for detecting a pressure of the working fluid in the reaction-force chamber R6 (hereinafter referred to as "reaction-force pressure $P_{RCT}$" where appropriate), namely, for detecting a reaction force with respect to the brake pedal 14 (which may be interpreted as the operation force applied to the brake pedal 14).

ii) Function of Master Cylinder

In a normal condition, the communication switching valve 72 is in the open state while the low-pressure-source shut-off valve 76 is in the closed state, and the reaction-force chamber R6 is defined by the inter-piston chamber R3 and the opposing chamber R5. In the present master cylinder 16, a pressure receiving area (pressure receiving area with respect to the inter-piston chamber) of the first pressurizing piston 42 on which the pressure of the working fluid in the inter-piston chamber R3 acts for moving the first pressurizing piston 42 forward, i.e., an area of a rear end face of the protruding portion 60 of the first pressurizing piston 42, is made equal to a pressure receiving area (pressure receiving area with respect to the opposing chamber) of the first pressurizing piston 42 on which a pressure of the working fluid in the opposing chamber R5 acts for moving the first pressurizing piston 42 rearward, i.e., an area of a front end face of the flange 56 of the first pressurizing piston 42. Consequently, even if the input piston 46 is moved forward by operating the brake pedal 14, the first pressurizing piston 42 and the second pressurizing piston 44 do not move forward by an operation force, namely, by the pressure in the reaction-force chamber R6, and the working fluid pressurized by the master cylinder 16 is not supplied to the brake devices 12. On the other hand, when a pressure of the working fluid from the high-pressure-source device 22 is introduced into the input chamber R4, the first pressurizing piston 42 and the second pressurizing piston 44 move forward in dependence on the pressure of the working fluid, and the working fluid pressurized in accordance with a pressure of the working fluid in the input chamber R4 is supplied to the brake devices 12. That is, according to the present master cylinder 16, the brake devices 12 generate, in the normal condition, the braking force whose magnitude depends on the pressure of the working fluid supplied from the high-pressure-source device 22 to the master cylinder 16, i.e., the pressure of the working fluid supplied from the regulator 24 to the master cylinder 16, without depending on the operation force applied to the brake pedal 14.

The vehicle on which the present system is installed is a hybrid vehicle as described above, and a regenerative braking force is available. It is consequently needed for the brake devices 12 to generate a braking force that corresponds to a difference obtained by subtracting the regenerative braking force from a braking force that is determined based on the brake operation. The present system effectuates the above-indicated state in which the braking force is generated in dependence on a high-pressure-source pressure, so that the brake devices 12 can generate the braking force that does not depend on the brake operation force. Thus, the present system is a hydraulic brake system suitable for the hybrid vehicles.

In the event of electric failure or at the time of rapid starting (which will be later explained in detail), on the other hand, the communication switching valve 72 and the low-pressure-source shut-off valve 76 are not energized. Accordingly, the communication switching valve 72 is in the closed state while the low-pressure-source shut-off valve 76 is in the open state, and the inter-piston chamber R3 is hermetically closed while the opposing chamber R5 is released to the atmospheric pressure. In this state, the operation force applied to the brake pedal 14 is transmitted to the first pressurizing piston 42 via the working fluid in the inter-piston chamber R3, so that the first pressurizing piston 42 and the second pressurizing piston 44 move forward. In other words, the brake devices 12 generate the braking force whose magnitude depends on the operation force applied to the brake pedal 14. When the working fluid whose pressure has been regulated by a master pressure $P_{MST}$ is introduced from the regulator 24 into the input chamber R4, the first pressurizing piston 42 and the second pressurizing piston 44 are moved forward by both of: the pressure of the working fluid supplied from the regulator 24 to the master cylinder 16; and the operation force, so that the brake devices 12 generate the braking force whose magnitude depends on both of them, namely, the braking force that is a sum of the braking force whose magnitude depends on the pressure of the working fluid supplied from the regulator 24 to the master cylinder 16 and the braking force whose magnitude depends on the operation force.

(d) High-Pressure-Source Device

The high-pressure-source device 22 includes a pump 90 for pumping up the working fluid from the reservoir 20, a pump motor 92 for driving the pump 90, and an accumulator [ACC] 94 for accumulating, in a pressurized state, the working fluid ejected from the pump 90. The pump motor 92 is controlled such that the pressure of the working fluid accumulated in the accumulator 94 falls within a predetermined range based on a detected value of a high-pressure-source pressure sensor [$P_{ACC}$] 96. The pressure of the working fluid accumulated in the accumulator 94 will be hereinafter referred to as "high-pressure-source pressure $P_{ACC}$" where appropriate. That is, the pressure is the so-called "accumulator pressure".

(e) Regulator i) Structure of Regulator

The regulator 24 is a pressure control valve of pilot-type configured to mechanically operate in accordance with a pressure of the working fluid to be supplied thereto, i.e., a pilot pressure. The regulator 24 regulates the pressure of the working fluid in the high-pressure-source device 22 in accordance with the pilot pressure and supplies the pressure-regulated working fluid to the input chamber R4 of the master cylinder 16.

Figure 2:
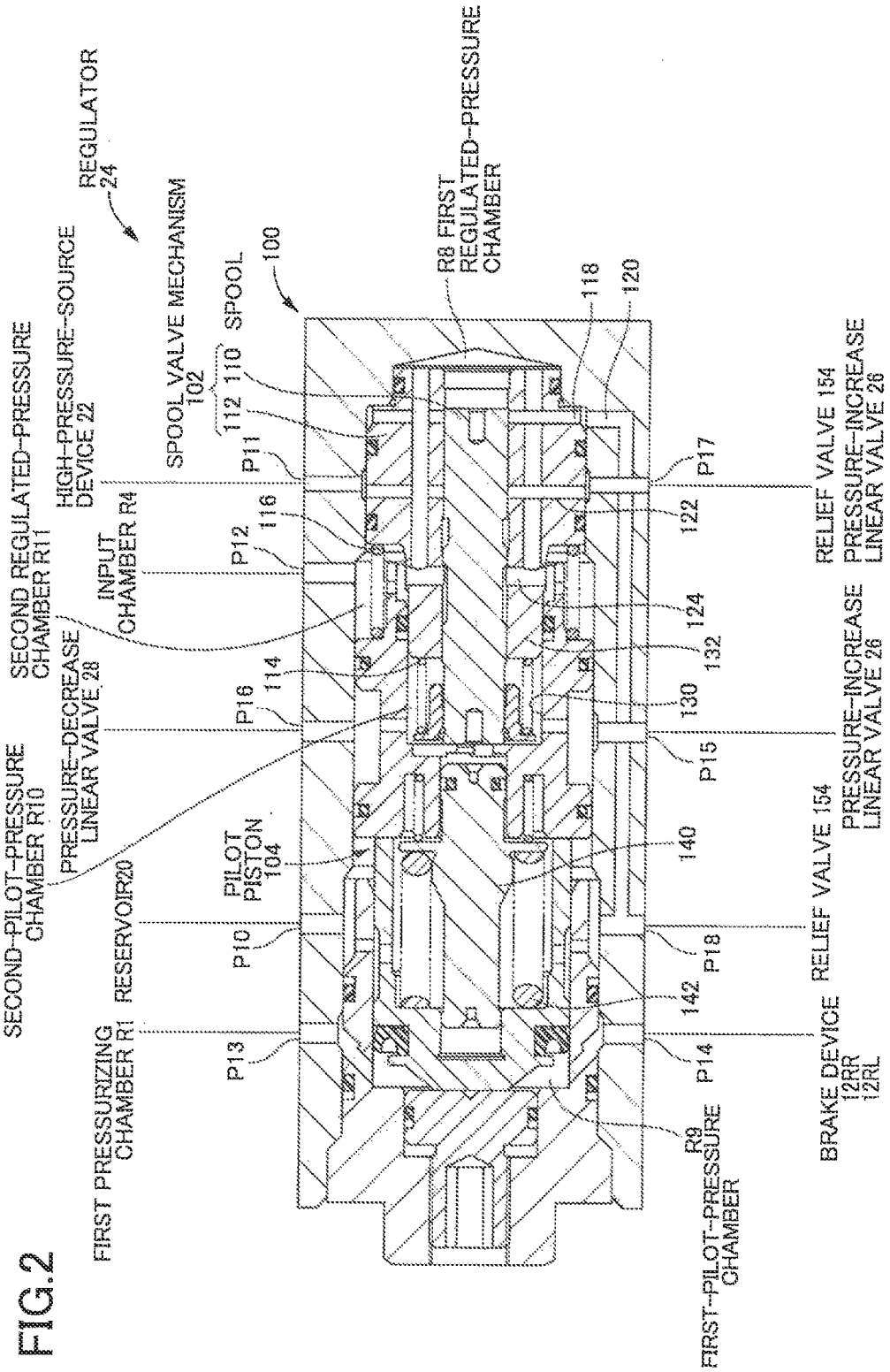
FIG. 2 is a cross-sectional view of a regulator shown in FIG. 1.

Referring to FIG. 2, the regulator 24 will be explained in detail. The regulator 24 mainly includes: a housing 100; and a spool valve mechanism 102 and a pilot piston 104 which are disposed in the housing 100. The center axis extending in the right-left direction in FIG. 2 is an axis of the regulator 24, specifically, an axis of the housing 100. The right side in FIG. 2 will be referred to as a one-end side while the left side in FIG. 2 will be referred to as the other-end side. Further, a movement of the pilot piston 104 and other members toward the one-end side will be referred to as a forward or advancing movement while a movement thereof toward the other-end side will be referred to as a rearward or retracting movement.

The spool valve mechanism 102 includes a spool 110 and a spool holding sleeve 112 that slidably holds the spool 110. The spool holding sleeve 112 is fitted in the housing 100 so as to be fixed to a portion of the housing 100 located near to the one-end side of the regulator 24. In other words, it may be considered that the spool holding sleeve 112 is a constituent element of the housing.

A regulated-pressure chamber R8 is defined by the spool holding sleeve 112 and the housing 100 so as to be located on one of opposite sides of the spool 110 that is nearer to the one-end side of the regulator 24. In the spool valve mechanism 102, when the spool 110 is located at a moving end position in its movable range, which moving end position is near to the other-end side of the regulator 24, communication between the reservoir 20 and the regulated-pressure chamber R8 is allowed while communication between the high-pressure-source device 22 and the regulated-pressure chamber R8 is shut off. When the spool 110 moves toward the one-end side of the regulator 24, the communication between the reservoir 20 and the regulated-pressure chamber R8 is shut off while the communication between the high-pressure-source device 22 and the regulated-pressure chamber R8 is allowed. The spool valve mechanism 102 will be explained below in detail.

The spool 110 extends from a portion of the spool holding sleeve 112 near to the other-end side of the regulator 24 and is biased toward the other-end side by a spacing spring 114 disposed between the spool 110 and the spool holding sleeve 112. The spacing spring 114 is a compression coil spring. A pilot piston 104 is disposed on the other of the opposite sides of the spool 110 that is nearer to the other-end side of the regulator 24. The pilot piston 104 is biased toward the other-end side of the regulator 24 by a spacing spring 116. The moving end position of the spool 110 in its movable range that is near to the other-end side is a position of the spool 110 when the spool 110 comes into contact with the pilot piston 104 that is in contact with an end of the housing 100 near to the other-end side of the regulator 24. When the spool 110 is located at the moving end position near to the other-end side, the regulated-pressure chamber R8 is in communication with an atmospheric-pressure port P10 which communicates with the reservoir 20 via the master cylinder 16, via an inner port 118 formed in the spool holding sleeve 112, an inner passage 120 formed in the housing 100, etc.

In addition to the atmospheric-pressure port P10, the housing 100 is provided with: a high-pressure port P11 to which the working fluid is supplied from the high-pressure-source device 22; and a regulated-pressure port P12 through which the pressure-regulated working fluid in the regulated-pressure chamber R8 is supplied to the input chamber R4 of the master cylinder 16. The spool holding sleeve 112 has inner ports 122, 124 for communication with the respective ports P11, P12. The inner port 124 for communication with the regulated-pressure port P12 is in communication with the regulated-pressure chamber R8 via an inner passage. When the spool 110 is located at its moving end position near to the other-end side of the regulator 24, the inner port 124 for communication with the regulated-pressure port P12 is closed by the outer circumferential surface of the spool 110, whereby the communication between the regulated-pressure chamber R8 and the high-pressure-source device 22 is shut off.

When the spool 110 moves toward the one-end side of the regulator 24, the two inner ports 122, 124 are brought into communication with each other by recesses formed on the outer circumferential surface of the spool 110. That is, the regulated-pressure chamber R8 and the high-pressure-source device 22 are brought into communication with each other. In this instance, the inner port 118 for communication with the atmospheric-pressure port P10 is closed by the outer circumferential surface of the spool 110, whereby the communication between the regulated-pressure chamber R8 and the reservoir 20 is shut off A first-pilot-pressure chamber R9 is defined by the pilot piston 104 and the housing 100 so as to be located on the other of opposite sides of the pilot piston 104 that is nearer to the other-end side of the regulator 24. The first-pilot-pressure chamber R9 communicates with first-pilot-pressure ports P13, P14 formed in the housing 100 via respective inner passages. As apparent from FIG. 1, the first-pilot-pressure chamber R9 communicates with the first pressurizing chamber R1 of the master cylinder 16 via the first-pilot-pressure port P13 and communicates with the brake devices 12RL, 12RR for the rear wheels via the first-pilot-pressure port P14. Thus, the first-pilot-pressure chamber R9 functions as a part of a supply passage for supplying the working fluid from the master cylinder 16 to the brake devices 12RL, 12RR. That is, the working fluid supplied from the master cylinder 16 to the brake devices 12RL, 12RR for the respective rear wheels 10RL, 10RR, namely, the working fluid having the master pressure $P_{MST}$, is introduced into the first-pilot-pressure chamber R9 as the working fluid having a first pilot pressure $P_{PLT1}$. Thus, the pilot piston 104 is configured to move forward together with the spool 110 by the pressure of the working fluid in the first-pilot-pressure chamber R9, namely, by the first pilot pressure $P_{PLT1}$.

The pilot piston 104 has a blind hole 130 formed at its portion near to the one-end side of the regulator 24. A portion of the spool holding sleeve 112 near to the other-end side of the regulator 24 is a small outside-diameter portion 132 having a smaller outside diameter than its portion near to the one-end side of the regulator 24. The outside diameter of the small outside-diameter portion 132 is substantially equal to a diameter of the blind hole 130, and the small outside-diameter portion 132 of the spool holding sleeve 112 protrudes into the blind hole 130. A second-pilot-pressure chamber R10 is defined between the pilot piston 104 and the spool 110, more specifically, defined by the blind hole 130 of the pilot piston 104 and respective end faces of the spool 110 and the spool holding sleeve 112 near to the other-end side of the regulator 24. The second-pilot-pressure chamber R10 is in communication with second-pilot-pressure ports P15, P16 formed in the housing 100. The second-pilot-pressure chamber R10 communicates with the pressure-increase linear valve 26 and the pressure-decrease linear valve 28 via the second-pilot-pressure port P15 and the second-pilot-pressure port P16, respectively. In this arrangement, the working fluid whose pressure has been adjusted by the pressure-increase linear valve 26 and the pressure-decrease linear valve 28 is introduced into the second-pilot-pressure chamber R10 as the working fluid having a second pilot pressure $P_{PLT2}$. Thus, the spool 110 is configured to move forward by the pressure of the working fluid in the second-pilot-pressure chamber R10, namely, by the second pilot pressure $P_{PLT2}$.

The pilot piston 104 holds a buffer piston 140 such that the buffer piston 140 is slidable within the pilot piston 104 in the axial direction. The buffer piston 140 is elastically supported by a buffer spring 142 which is a compression coil spring. The buffer piston 140 has a space at its distal end near to the one-end side of the regulator 24. This space communicates with the second-pilot-pressure chamber R10 and has a function of suppressing vibration generated in the second pilot pressure $P_{PLT2}$. An inner space of the pilot piston 104 in which the buffer piston 140 is disposed communicates with the atmospheric-pressure port P10, so that the fluid pressure in the inner space is always kept at the atmospheric pressure.

Another regulated-pressure chamber R11 is formed around an outer circumference of the small outside-diameter portion 132 of the spool holding sleeve 112, so as to be defined by the pilot piston 104 and the housing 100. The regulated-pressure chamber R11 is held in communication with the regulated-pressure chamber R8. That is, the pilot piston 104 is configured to receive a force that moves the pilot piston 104 toward the other-end side of the regulator 24 by the fluid pressure in the regulated-pressure chamber R11. In the following explanation, the regulated-pressure chamber R8 formed on the one of opposite sides of the spool 110 that is nearer to the one-end side of the regulator 24 will be referred to as a first regulated-pressure chamber R8 while the regulated-pressure chamber R11 formed on one of the opposite sides of the pilot piston 104 that is nearer to the one-end side of the regulator 24 will be referred to as a second regulated-pressure chamber R11. A servo pressure sensor [$P_{SRV}$] 152 is provided in a servo passage 150 for detecting a servo pressure $P_{SRV}$ which is a pressure of the working fluid regulated by the regulator 24 and to be supplied to the input chamber R4. The servo passage 150 is a fluid passage connecting the regulated-pressure port P12 and the input port P5 for communication between the regulated-pressure chambers R8, R11 and the input chamber R4.

The housing 100 further includes another high-pressure port P17 which communicates with the high-pressure port P11 via an inner passage. As apparent from FIG. 1, the high-pressure port P17 communicates with the pressure-increase linear valve 26 and a relief valve 154. The housing 100 further includes another atmospheric-pressure port P18 which communicates with the atmospheric-pressure port P10 via an inner passage. As apparent from FIG. 1, the atmospheric-pressure port P18 communicates with the relief valve 154. Thus, the working fluid having the high-pressure-source pressure $P_{ACC}$ and output from the high-pressure-source device 22 is supplied to the pressure-increase linear valve 26 via the regulator 24. When the high-pressure-source pressure $P_{ACC}$ becomes equal to or higher than a set pressure, the working fluid output from the high-pressure-source device 22 flows into the reservoir 20 via the regulator 24.

ii) Function of Regulator

In the regulator 24, when the second pilot pressure $P_{PLT2}$, which is the pressure of the working fluid in the secondpilot-pressure chamber R10, is increased by the pressure-increase linear valve 26 and the pressure-decrease linear valve 28, the spool 110 is biased by the second pilot pressure $P_{PLT2}$ and is moved from the moving end position near to the other-end side of the regulator 24 toward the one-end side of the regulator 24. The spool valve mechanism 102 brings the high-pressure-source device 22 and the regulated-pressure chambers R8, R11 into communication with each other by the movement of the spool 110, so that the pressure of the working fluid to be supplied to the input chamber R4 of the master cylinder 16, namely, the servo pressure $P_{SRV}$, is increased. The increase in the servo pressure $P_{SRV}$ causes an increase in the pressure of the working fluid in the regulated-pressure chamber R8, so that the spool 110 is biased by the servo pressure $P_{SRV}$. That is, a state in which a force that moves the spool 110 forward by the second pilot pressure $P_{PLT2}$ and a force that moves the spool 110 rearward by the servo pressure $P_{SRV}$ are balanced is maintained, so that the pressure of the working fluid to be supplied to the master cylinder 16, i.e., the servo pressure $P_{SRV}$, is regulated to a level based on the second pilot pressure $P_{PLT2}$ (second state). In this respect, a pressure receiving area of the spool 110 by which the fluid pressure (the second pilot pressure $P_{PLT2}$) of the second-pilot-pressure chamber R10 is received and a pressure receiving area of the spool 110 by which the fluid pressure (the servo pressure $P_{SRV}$) of the first regulated-pressure chamber R8 is received are made substantially equal to each other, and the servo pressure $P_{SRV}$ is regulated to substantially the same level as the second pilot pressure $P_{PLT2}$. (In a strict sense, the servo pressure $P_{SRV}$ is slightly lower than the second pilot pressure $P_{PLT2}$.)

To the first-pilot-pressure chamber R9, the working fluid having the master pressure $P_{MST}$ is introduced as the working fluid having the first pilot pressure $P_{PLT1}$. A ratio of pressure increase in the master cylinder 16, namely, a ratio of the master pressure $P_{MST}$ to the servo pressure $P_{SRV}$, is substantially 1. There act, on the pilot piston 104, a force that moves the pilot piston 104 forward by the fluid pressure (the first pilot pressure $P_{PLT1}$=the master pressure $P_{MST}$) in the first-pilot-pressure chamber R9, a force that moves the pilot piston 104 rearward by the fluid pressure (the second pilot pressure $P_{PLT2}$) in the second-pilot-pressure chamber R10, and a force that moves the pilot piston 104 rearward by the fluid pressure (the servo pressure $P_{SRV}$) in the second regulated-pressure chamber R11. In the regulator 24, the forces that move the pilot piston 104 rearward are larger than the force that moves the pilot piston 104 forward. Consequently, the pilot piston 104 does not move forward, and the force that depends on the first pilot pressure $P_{PLT1}$ does not act on the spool 110 when pressure regulation by the second pilot pressure $P_{PLT2}$ is conducted.

On the other hand, in the event of electric failure or at the time of rapid starting, pressure regulation by the first pilot pressure $P_{PLT1}$ is conducted. In this instance, the second-pilot-pressure chamber R10 is released to the atmospheric pressure. When the master pressure $P_{MST}$, which is the pressure of the working fluid introduced as the working fluid having the first pilot pressure $P_{PLT1}$, is increased, the pilot piston 104 is moved forward and comes into contact with the spool 110. In this state, the pilot piston 104 is moved forward with the spool 110, so that the spool 110 is moved from the moving end position near to the other-end side of the regulator 24 toward the one-end side of the regulator 24. The spool valve mechanism 102 brings the high-pressure-source device 22 and the regulated-pressure chambers R8, R11 into communication with each other by the movement of the spool 110, so that the pressure of the working fluid to be supplied to the input chamber R4 of the master cylinder 16, namely, the servo pressure $P_{SRV}$, is increased. The increase in the servo pressure $P_{SRV}$ causes increases in the pressure of the working fluid in the first regulated-pressure chamber R8 and the pressure of the working fluid in the second regulated-pressure chamber R11, so that the pilot piston 104 and the spool 110 are biased by the servo pressure $P_{SRV}$. In other words, a state in which a force that moves the pilot piston 104 and the spool 110 forward by the first pilot pressure $P_{PLT2}$ and a force that moves the pilot piston 104 and the spool 110 rearward by the servo pressure $P_{SRV}$ are balanced is maintained, so that the pressure of the working fluid to be supplied to the master cylinder 16, i.e., the servo pressure $P_{SRV}$, is regulated to a level based on the first pilot pressure $P_{PLT1}$ (first state).

The spool 110 has a relatively small outside diameter because it is advantageous from the viewpoint of preventing leakage of the working fluid by narrowing a clearance between the spool 110 and the spool holding sleeve 112. In contrast, the pilot piston 104 has an outside diameter larger than that of the spool 110. In other words, a pressure receiving area $A_{P\_r}$ of the pilot piston 104 by which the first pilot pressure $P_{PLT1}$ is received at a portion of the pilot piston 104 near to the other-end-side of the regulator 24 is made larger than a pressure receiving area $A_{SP}$ of the spool 110 by which the servo pressure $P_{SRV}$ is received. Accordingly, the master pressure for moving the pilot piston 104 need not be high. On the other hand, the pressure receiving area $A_{P\_r}$ of the pilot piston 104 by which the first pilot pressure $P_{PLT1}$ is received at the portion of the pilot piston 104 near to the other-end-side of the regulator 24 is made substantially equal to a sum of the pressure receiving area $A_{SP}$ of the spool 110 by which the fluid pressure (the servo pressure $P_{SRV}$) in the first regulated-pressure chamber R8 is received and a pressure receiving area $A_{P\_fl}$ of the pilot piston 104 by which the fluid pressure (the servo pressure $P_{SRV}$) in the second regulated-pressure chamber R11 is received at a portion of the pilot piston 104 near to the one-end side of the regulator 24. Consequently, the servo pressure $P_{SRV}$ is regulated to substantially the same level as the first pilot pressure $P_{PLT2}$. (In a strict sense, the servo pressure $P_{SRV}$ is slightly lower than the first pilot pressure $P_{PLT2}$.)

f) Pressure-Increase Linear Valve and Pressure-Decrease Linear Valve

The pressure-increase linear valve 26 and the pressure-decrease linear valve 28 are ordinary electromagnetic linear valves, and illustration of the structure thereof is dispensed with. The pressure-increase linear valve 26 is a normally-closed electromagnetic linear valve disposed between the high-pressure-source device 22 and the regulator 24. With an increase in an energizing current supplied to a coil, an opening degree (e.g., a degree of easiness with which the state of the valve changes from the closed state to the open state) becomes higher, and a valve-opening pressure becomes higher. Where a pressure difference between an upstream side of the pressure-increase linear valve 26 and a downstream side thereof is constant, the amount of the working fluid that flows through the pressure-increase linear valve 26 increases with an increase in the current supplied thereto. The pressure-decrease linear valve 28 is a normally-opened electromagnetic linear valve disposed between the regulator 24 and the reservoir 20 as the low-pressure source. With an increase in an energizing current supplied to a coil, an opening degree (e.g., a degree of easiness with which the state of the valve changes from the closed state to the open state) becomes lower, and a valve-opening pressure becomes higher.

The pressure-increase linear valve 26 and the pressure-decrease linear valve 28 are disposed in series with the regulator 24 interposed therebetween, more specifically, with the second-pilot-pressure chamber R10 of the regulator 24 interposed therebetween. The pressure of the working fluid in the second-pilot-pressure chamber R10 is controlled by controlling the energizing current supplied to each of the pressure-increase linear valve 26 and the pressure-decrease linear valve 28. In view of the functions of the pressure-increase linear valve 26 and the pressure-decrease linear valve 28, the pressure-increase linear valve 26 and the pressure-decrease linear valve 28 constitute a pressure adjuster configured to adjust the pressure of the working fluid to a predetermined level by control and to supply the pressure-adjusted working fluid to the second-pilot-pressure chamber R10.

g) Control System

Control of the present system, namely, brake control, is executed by the brake ECU 30. Roughly, the brake ECU 30 controls the high-pressure-source device 22, more specifically, the motor 92 of the high-pressure-source device 22, and further controls the pressure-increase linear valve 26 and the pressure-decrease linear valve 28. The brake ECU 30 is constituted by a computer as a main element and drive circuits (drivers) for driving the motor 92 of the high-pressure-source device 22, the pressure-increase linear valve 26, the pressure-decrease linear valve 28, and so on.

To the brake ECU 30, the following sensors are connected: the reaction-force pressure sensor 86 for detecting the reaction-force pressure $P_{RCT}$; the high-pressure-source pressure sensor 96 for detecting the high-pressure-source pressure $P_{ACC}$; and the servo pressure sensor 152 for detecting the servo pressure $P_{SRV}$. The pressures $P_{RCT}$, $P_{ACC}$, $P_{SRV}$ are obtained as information necessary for the control. Further, the present system is provided with a brake operation amount sensor [$\delta_{PDL}$] 160 for detecting an operation amount of the brake pedal 14, a brake switch [$SW_{BR}$] 162 for detecting whether or not the brake pedal 14 is being depressed, a door open/close switch [$SW_{DR}$] 164 for detecting whether a door for a driver's seat is open or closed, an ignition switch [$SW_{IG}$] 166, and a vehicle speed sensor [V] 168 for detecting a running speed V of the vehicle. The brake switch 162 is placed to the OFF position when the operation amount of the brake pedal 14 is smaller than a set amount and to the ON position when the operation amount of the brake pedal 14 is equal to or larger than the set amount. The door open/close switch 164 is placed to the OFF position when the door is in a closed state and to the ON position when the door is in an open state. The ignition switch 166 is configured such that switching thereof from OFF to ON is permitted when the door open/close switch 164 is placed to the ON position and then the brake switch 162 is placed to the ON position. The ECU 30 of the present system executes the control based on the values detected by the sensors.

Operation of Hydraulic Brake System (A) Operation and Control in Normal Condition (Second Pressurizing State, Second Pressure-Regulating State)

In the vehicle on which the present hydraulic brake system is installed, the ECU 30 calculates a required braking force based on both of: a brake operation amount $\delta_{PDL}$ obtained based on the detected value of the brake operation amount sensor 160; and a brake operation force $F_{PDL}$ obtained based on the detected value $P_{RCT}$ of the reaction-force pressure sensor. The ECU 30 then determines, as a required hydraulic braking force, a difference obtained by subtracting a regenerative braking force to be generated by a regenerative brake system from the calculated required braking force. The present hydraulic brake system operates to generate the required hydraulic braking force.

Figure 3:
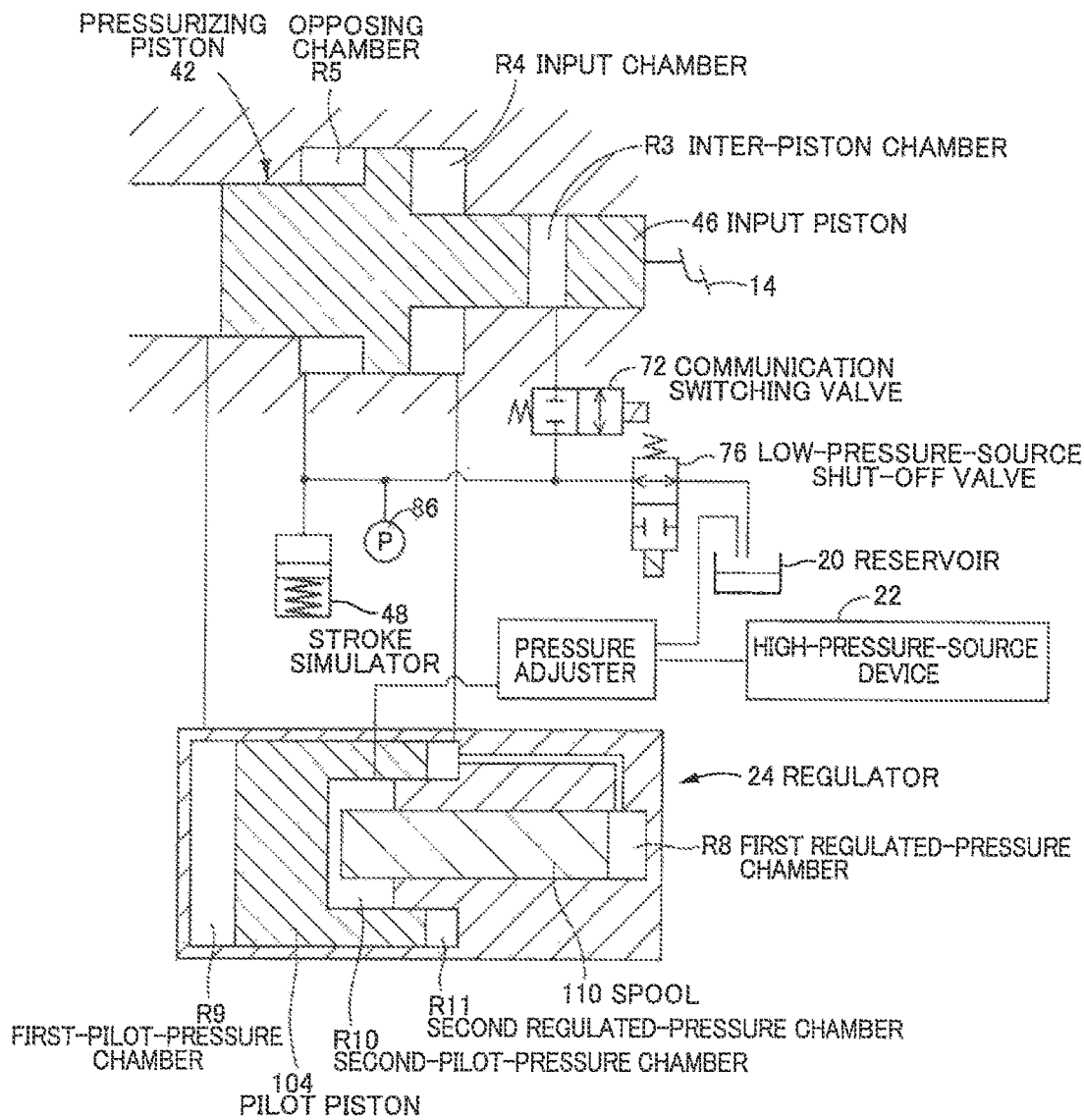
FIG. 3 schematically shows a principal part of the hydraulic brake system according to the embodiment.

The operation of the master cylinder 16 is explained. In the normal condition, the ECU 30 controls the communication switching valve 72 and the low-pressure-source shut-off valve 76 to be energized such that the communication switching valve 72 is placed in the open state and the low-pressure-source shut-off valve 76 is placed in the closed state (second pressurizing state). FIG. 3 schematically illustrates principal parts of the present hydraulic brake system. The pressure of the working fluid is introduced into the input chamber R4 from the regulator 24, and the first pressurizing piston 42 and the second pressurizing piston 44 are moved forward in dependence on the introduced pressure of the working fluid, whereby the working fluid pressurized in accordance with the pressure of the working fluid in the input chamber R4 (the working fluid having the master pressure $P_{MST}$) is supplied to the brake devices 12. That is, in the normal condition, the ECU 30 controls the fluid pressure in the input chamber R4, i.e., the servo pressure $P_{SRV}$, such that the required hydraulic braking force described above is generated. In other words, the ECU 30 effectuates a second pressure-regulating state in which the second pilot pressure $P_{PLT2}$ in the regulator 24 is controlled to regulate the fluid pressure in the regulated-pressure chamber R8 to a level in accordance with the second pilot pressure $P_{PLT2}$, so as to control the servo pressure $P_{SRV}$. In the following explanation, a state in which the pressurizing state of the master cylinder 16 is the second pressurizing state and the pressure-regulating state of the regulator 24 is the second pressure-regulating state will be referred to as a second state where appropriate.

In the second state, the inter-piston chamber R3 (the reaction-force chamber R6) is held in communication with the stroke simulator 48. Thus, the operation feeling of the brake pedal 14 is determined by the stroke simulator 48.

The ECU 30 determines a target servo pressure $P_{SRV}^*$ based on the required hydraulic braking force and executes feedback control such that an actual servo pressure $P_{SRV}$ obtained based on the detected value of the servo pressure sensor 152 becomes equal to the target servo pressure. The feedback control is executed based on a deviation $\Delta P_{SRV}$ of the actual servo pressure $P_{SRV}$ from the target servo pressure $P_{SRV}^*$. More specifically, when the deviation $\Delta P_{SRV}$ is larger than a pressure-increase threshold $\Delta P_+$, a pressure-increase mode is established. When the deviation $\Delta P_{SRV}$ is smaller than a pressure-decrease threshold $\Delta P_-$, a pressure-decrease mode is established. When the deviation $\Delta P_{SRV}$ is not smaller than the pressure-decrease threshold $\Delta P_-$ and is not larger than the pressure-increase threshold $\Delta P_+$, a pressure-holding mode is established.

In the pressure-increase mode, the pressure-decrease linear valve 28 is closed, and the working fluid is supplied to the second-pilot-pressure chamber R10 by controlling the pressure-increase linear valve 26, so that the second pilot pressure $P_{PLT2}$ is increased. A supply current $I_{SLA}$ to the pressure-increase linear valve 26 is determined according to the following formula based on: a valve-open current $I_{SLA-OPEN}$ in accordance with a pressure difference between the upstream side and the downstream side of the valve 26; and the deviation $\Delta P_{SRV}$.

$$I_{SLA} = I_{SLA-OPEN} + K_{SLA} \cdot \Delta P_{SRV} \quad K_{SLA}: \text{control gain}$$

The pressure difference between the upstream side and the downstream side of the valve 26 is obtained from a difference between the detected value of the high-pressure-source pressure sensor 96 and the second pilot pressure $P_{PLT2}$ (the actual servo pressure $P_{SRV}$), for instance. The valve-open current $I_{SLA\text{-}OPEN}$ is obtained from map data indicative of a relationship between the pressure difference and the valve-open current $I_{SLA\text{-}OPEN}$.

In the pressure-decrease mode, the pressure-increase linear valve 26 is closed, and the second pilot pressure $P_{PLT2}$ is decreased by controlling the pressure-decrease linear valve 28. A supply current $I_{SLR}$ to the pressure-decrease linear valve 28 is determined according to the following formula based on: a valve-open current $I_{SLR\text{-}OPEN}$ in accordance with a pressure difference between the upstream side and the downstream side of the valve 28; and the deviation $\Delta P_{SRV}$.

$$I_{SLR}=I_{SLR\text{-}OPEN}-K_{SLR}\cdot\Delta P_{SRV}\ K_{SLR}\text{: control gain}$$

In the pressure-holding mode, the pressure-increase linear valve 26 and the pressure-decrease linear valve 28 are placed in the closed state, and the second pilot pressure $P_{PLT2}$ is maintained. The supply current to each of the pressure-increase linear valve 26 and the pressure-decrease linear valve 28 in this instance is equal to a level at which the valves 26, 28 are kept closed even if a pressure-difference-based acting force at the time when the second pilot pressure reaches the target servo pressure acts thereon. This is true of the supply current to the pressure-decrease linear valve 28 in the pressure-increase mode and the supply current to the pressure-increase linear valve 26 in the pressure-decrease mode.

(B) Operation in the Event of Failure

In the event of electric failure, the control by the ECU 30 is not executed. That is, the communication switching valve 72 and the low-pressure-source shut-off valve 76 are not energized. Consequently, the communication switching valve 72 is placed in the closed state, and the low-pressure-source shut-off valve 76 is placed in the open state (first pressurizing state). In other words, the operation force applied to the brake pedal 14 is transmitted to the first pressurizing piston 42 via the working fluid in the inter-piston chamber R3, so that the brake devices 12 generate the braking force whose magnitude depends on the operation force applied to the brake pedal 14. The working fluid pressurized in dependence on the brake operation force is supplied from the output port P3. The pressurized working fluid is introduced into the first-pilot-pressure chamber R9 of the regulator 24, so that the pressure regulation by the first pilot pressure $P_{PLT1}$ (the master pressure $P_{MST}$) is conducted in the regulator 24 (first pressure-regulating state), and the working fluid having the servo pressure $P_{SRV}$ in accordance with the master pressure $_{MST}$ is supplied from the regulator 24 to the input chamber R4 of the master cylinder 16 as long as the high-pressure working fluid remains in the accumulator 94. The supply of the working fluid causes the braking force to be generated in the brake device 12 for each wheel 10, the braking force having a magnitude that depends on both of the brake operation force and the pressure of the working fluid supplied from the high-pressure-source device 22 and regulated by the regulator 24. In the following explanation, a state in which the pressurizing state of the master cylinder 16 is the first pressurizing state and the pressure-regulating state of the regulator 24 is the first pressure-regulating state will be referred to as a first state. The brake device 12 for each wheel 10 generates the braking force in dependence on the brake operation force after the high-pressure working fluid no longer remains in the accumulator 94.

In this first state, the operation feeling of the brake pedal 14 is determined by a return spring 180 disposed between the two pressurizing pistons 42, 44, a return spring 182 disposed between the second pressurizing piston 44 and the housing 40, etc.

(C) Switching Between First State and Second State in Normal Condition

In an instance where the hydraulic brake system is in the normal condition, the hydraulic brake system is placed in the first state when the ignition switch 166 is OFF while placed in the second state when the ignition switch 166 is ON. When electric current is supplied to the ECU 30, namely, the ECU 30 is energized, upon satisfaction of conditions explained below, preparations for execution by the ECU 30 such as reading of programs and initial checking are made. After completion of the preparations, there is issued a switching command for switching the state of the brake system from the first state to the second state. Consequently, electric current is supplied to the communication switching valve 72 and the low-pressure-source shut-off valve 76 so as to place the communication switching valve 72 in the open state and to place the low-pressure-source shut-off valve 76 in the closed state, and the fluid pressure in the input chamber R4 starts to be controlled.

Figure 4A:
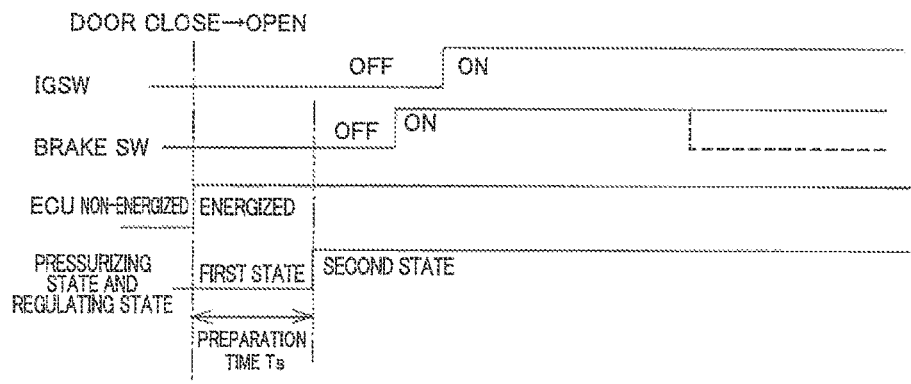
FIG. 4A shows an ordinary situation in which a driver gets into a vehicle and the ignition switch is subsequently turned on, FIG. 4B shows a situation in which the ignition switch is not turned on for a long time after a state of a door has been changed from an open state to a closed state.

As shown in FIG. 4A, electric current starts to be supplied to the ECU 30 on the condition that the door open/close switch 164 is switched from OFF to ON in a state in which the ignition switch 166 is OFF. After the preparations described above have been completed, the state of the brake system is switched from the first state to the second state. In general, a preparation time Ts is required before the second state is established after the start of supply of electric current to the ECU 30. Usually, the driver opens the door for the driver's seat, gets into the vehicle, depresses the brake pedal 14, and turns on the ignition switch 166. The preparation time Ts is shorter than a time ordinarily required before the brake pedal 14 is depressed after the driver has opened the door. In other words, the brake pedal 14 is depressed after the second state has been established, and the ignition switch 166 is thereafter turned on.

Figure 4B:
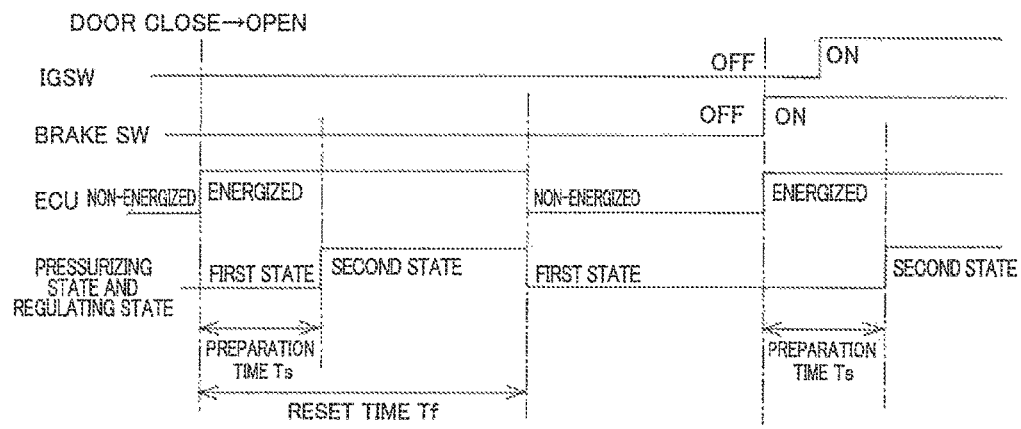
FIG. 4 is a diagram for explaining a relationship among a first state and a second state of the hydraulic brake system, a state of energization of an ECU, a state of a brake switch, and a state of an ignition switch when switching between the first state and the second state of the hydraulic brake system is carried out.
FIG. 4C shows a situation in which the driver again turns on the ignition switch without getting off the vehicle after the ignition switch has been turned off.

On the other hand, as shown in FIG. 4B, even if electric current starts to be supplied to the ECU 30 when the door for the driver's seat is opened, and the second state is subsequently established, there may be a case in which the ignition switch 166 is not turned on within a predetermined reset time Tf. In such a case, the supply of electric current to the ECU 30 stops, and the state of the brake system is returned to the first state. For instance, such a case includes a case in which the driver does not immediately get into the vehicle after the driver has opened the door for the driver's seat and a case in which the ignition switch 166 is not immediately turned on after the driver has got into the vehicle. In such a case, electric current starts to be supplied to the ECU 30 on the condition that the brake switch 162 is switched from OFF to ON, and the switching command is issued for switching the state of the brake system from the first state to the second state (rapid starting).

Figure 4C:
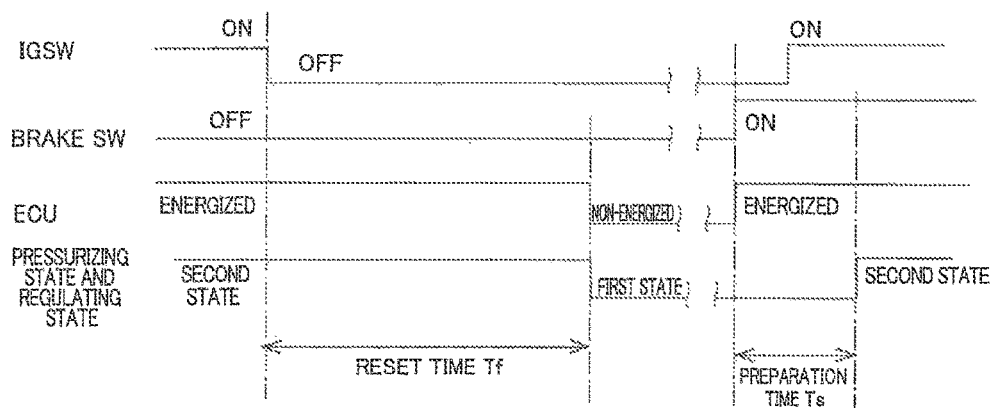

As shown in FIG. 4C, when the reset time Tf elapses after the ignition switch 166 has been switched from ON to OFF, the supply of electric current to the ECU 30 stops, and the state of the brake system is returned to the first state. Thereafter, the driver may again start the vehicle after a time period, which is not shorter than the reset time Tf, has elapsed without getting off the vehicle. In such a case, the supply of electric current to the ECU 30 starts on the condition that the brake switch 162 is switched from OFF to ON, and the switching command for switching the state of the brake system from the first state to the second state is issued.

Next, the case of rapid starting shown in FIGS. 4B and 4C will be considered. That is, a case is considered in which the state of the brake system is switched from the first state to the second state with the brake pedal 14 depressed. In a non-energized state of the ECU 30 in which no electric current is supplied to the ECU 30, namely, when the communication switching valve 72 is placed in the closed state and the low-pressure-source shut-off valve 76 is placed in the open state, depression of the brake pedal 14 causes the brake devices 12 to generate the braking force whose magnitude depends on the operation force applied to the brake pedal 14. Because the supply of electric current to the ECU 30 starts on the condition that the brake pedal 14 is depressed, the high-pressure-source device 22 is activated so as to supply the high-pressure working fluid to the regulator 24. That is, the working fluid pressurized in dependence on the brake operation force is introduced into the first-pilot-pressure chamber R9 of the regulator 24, and the pressure regulation by the first pilot pressure $P_{PLT1}$ (the master pressure $P_{MST}$) is conducted in the regulator 24. The working fluid having the servo pressure $P_{SRV}$ in accordance with the master pressure $P_{MST}$ is supplied from the regulator 24 to the input chamber R4 of the master cylinder 16. The supply of the working fluid causes the braking force to be generated in the brake device 12 for each wheel 10, the braking force having a magnitude that depends on both of the brake operation force and the pressure of the working fluid regulated by the regulator 24.

Thereafter, the first state is switched to the second state. In this instance, a trouble may occur in generating the braking force that depends only on the pressure of the working fluid regulated by the regulator 24 because the brake devices 12 have been already generating the braking force whose magnitude depends on both of the brake operation force and the pressure of the working fluid regulated by the regulator 24.

As explained above, the operation feeling of the brake pedal 14 in the first state is determined by the return springs 180, 182, etc., while the operation feeling of the brake pedal 14 in the second state is determined by the stroke simulator 48. Consequently, when the state of the brake system is switched from the first state to the second state, the operation feeling changes, so that an unnatural feeling is given to the driver.

In the first state, the fluid pressure in the inter-piston chamber R3 has a level in accordance with the operation force applied to the brake pedal 14, and the fluid pressure in the opposing chamber R5 has a level substantially equal to the atmospheric pressure (the fluid pressure in the reservoir 20). If the inter-piston chamber R3 and the opposing chamber R5 are immediately brought into communication with each other by the communication switching valve 72 as in conventional systems, the fluid pressure in the inter-piston chamber R3 is abruptly lowered, and the reaction force applied to the brake pedal 14 accordingly becomes small. That is, if the driver is depressing the brake pedal 14 with a given force, the brake pedal 14 will sink such that its operation amount increases.

(D) Pressurizing-State Switching Control

In view of the above situation, pressurizing-state switching control is executed in the present hydraulic brake system when the first state is switched to the second state with the brake pedal 14 depressed, so as to avoid or reduce an occurrence of the trouble described above. In the pressurizing-state switching control, after the pressure-regulating state of the regulator 24 has been switched from the first pressure-regulating state to the second pressure-regulating state by increasing the second pilot pressure $P_{PLT2}$ by the pressure adjuster (the pressure-increase linear valve 26 and the pressure-decrease linear valve 28) while the first pressurizing state is maintained, switching of the state of the low-pressure-source shut-off valve 76 from the open state to the closed state and switching of the state of the communication switching valve 72 from the closed state to the open state are carried out based on a change in the servo pressure $P_{SRV}$ caused by the increased second pilot pressure $P_{PLT2}$.

i) Start of Increasing of Second Pilot Pressure

When the pressurizing-state switching control starts upon satisfaction of conditions explained below in detail, the ECU 30 closes the pressure-decrease linear valve 28 and controls the pressure-increase linear valve 26 to supply the working fluid to the second-pilot-pressure chamber R10, so as to increase the second pilot pressure $P_{PLT2}$. The supply current $I_{SLA}$ to the pressure-increase linear valve 26 in this instance is determined in accordance with the operation amount $\delta_{PDL}$ of the brake pedal 14 detected by the brake operation amount sensor 160. The supply current $I_{SLA}$ increases with an increase in the operation amount $\delta_{PDL}$. The increase in the second pilot pressure causes the pilot piston 104 to be separated away from the spool 110, and the pressure-regulating state of the regulator 24 is switched from the first pressure-regulating state to the second pressure-regulating state.

In the regulator 24, an area $A_{P\_f2}$ of the pilot piston 104 by which the second pilot pressure $P_{PLT2}$ is received at a portion of the pilot piston 104 near to the one-end side of the regulator 24 is made larger than the pressure receiving area $A_{SP}$ of the spool 110 by which the second pilot pressure $P_{PLT2}$ is received by a portion of the spool 110 near to the other-end side of the regulator 24. Consequently, with an increase in the second pilot pressure $P_{PLT2}$, the force that moves the pilot piston 104 rearward exceeds the force that moves the pilot piston 104 forward by the master pressure $P_{MST}$ before the force that moves the spool 110 forward is balanced with the force that moves the spool 110 rearward by the servo pressure $P_{SRV}$. As a result, the pilot piston 104 starts to move rearward, and the spool 110 moves rearward. That is, in the present regulator 24, the rearward movement of the spool 110 causes a decrease in the servo pressure $P_{SRV}$.

In the master cylinder 16, a force that moves the first pressurizing piston 42 forward decreases when the servo pressure $P_{SRV}$ decreases, so that the first pressurizing piston 42 moves rearward. That is, the fluid pressure in the inter-piston chamber R3 increases, and the reaction force to the brake pedal 14 accordingly increases, giving the driver an unnatural feeling. In the present hydraulic brake system, therefore, the pressurizing-state switching control starts in a situation in which an operation to decrease the braking force has been made on the brake pedal 14. That is, the pressurizing-state switching control is executed in a period in which the brake pedal 14 is returning to its original position from its depressed state so as to prevent the driver from feeling, as an unnatural feeling, the increase in the reaction force to the brake pedal 14 that results from the decreased servo pressure.

Whether or not the vehicle is in the situation in which the operation to decrease the braking force has been made on the brake pedal 14 is determined based on whether the vehicle speed V detected by the vehicle speed sensor 168 has exceeded a set value $V_0$ (e.g., 1.0 km/h). More specifically, when the vehicle V exceeds the set value $V_0$, it is determined that the vehicle is in the situation in which the operation to decrease the braking force has been made on the brake pedal 14, and the pressurizing-state switching control starts to be executed. The determination as to whether or not the vehicle is in the situation in which the operation to decrease the braking force has been made on the brake pedal 14 may be made based on whether the operation amount of the brake pedal 14 has been decreased or whether the servo pressure $P_{SRV}$ has been decreased.

ii) Switching of State of Low-Pressure-Source Shut-Off Valve

Subsequently, the ECU 30 switches the state of the low-pressure-source shut-off valve 76 from the open state to the closed state. More specifically, the ECU 30 monitors the servo pressure $P_{SRV}$ detected by the servo pressure sensor 152, and switches the state of the low-pressure-source shut-off valve 76 from the open state to the closed state by supplying electric current thereto on the condition that the decrease in the servo pressure $P_{SRV}$ stops. In the present system, whether or not the decrease in the servo pressure $P_{SRV}$ has stopped is determined based on whether the servo pressure $P_{SRV}$ has started to increase. When the increase amount of the servo pressure $P_{SRV}$ becomes larger than a set value, it is determined that the decrease in the servo pressure $P_{SRV}$ has stopped, and the state of the low-pressure-source shut-off valve 76 is switched from the open state to the closed state. The determination as to whether or not the decrease in the servo pressure $P_{SRV}$ has stopped may be made based on whether a gradient of the decrease in the servo pressure $P_{SRV}$ becomes smaller than a set value.

For instance, a case is considered in which the low-pressure-source shut-off valve 76 is placed in the closed state before the servo pressure $P_{SRV}$ is decreased. In the master cylinder, the opposing chamber R5 is in the closed state, and the volume of the opposing chamber R5 increases when the first pressurizing piston 42 moves rearward due to the decrease in the servo pressure. That is, the fluid pressure in the opposing chamber R5 decreases by the rearward movement of the first pressurizing piston 42, and a difference in the fluid pressure between the inter-piston chamber R3 and the opposing chamber R5 becomes large. When the closed state of the communication switching valve is switched to the open state in this state, the fluid pressure in the inter-piston chamber R3 largely decreases, so that the brake pedal 14 sinks such that the operation amount thereof increases.

In the present hydraulic brake system, in contrast, the low-pressure-source shut-off valve 76 is placed into the closed state and the opposing chamber R5 is closed after the decrease in the servo pressure has stopped, whereby the fluid pressure in the opposing chamber R5 is prevented from being decreased.

The ECU 30 supplies electric current to the low-pressure-source shut-off valve 76 as described above and also starts to execute the feedback control of the second pilot pressure $P_{PLT2}$. In this instance, the communication switching valve 72 is in the closed state, and the inter-piston chamber R3 is not held in communication with the stroke simulator 48. Consequently, the ECU 30 calculates the required braking force based on only the brake operation amount $\delta_{PDL}$ obtained based on the detected value of the brake operation amount sensor 160 without using the brake operation force $F_{PDL}$ obtained based on the detected value $P_{RCT}$ of the reaction-force pressure sensor.

iii) Switching of State of Communication Switching Valve (Switching to Second Pressurizing State)

Subsequently, the ECU 30 switches the state of the communication switching valve 72 from the closed state to the open state. More specifically, the ECU 30 switches the state of the communication switching valve 72 from the closed state to the open state by supplying electric current thereto on the condition that the actual servo pressure $P_{SRV}$ detected by the servo pressure sensor 152 reaches the target servo pressure $P_{SRV}$ determined based on the required braking force. That is, in the present hydraulic brake system, the servo pressure $P_{SRV}$ is increased to the target servo pressure $P_{SRV}^*$ in the feedback control by placing both of the communication switching valve 72 and the low-pressure-source shut-off valve 76 in the closed state, whereby the first pressurizing piston 42 moves forward and the fluid pressure in the opposing chamber R5 is increased. In other words, after the difference in the fluid pressure between the inter-piston chamber R3 and the opposing chamber R5 has become small, the communication switching valve 72 is placed into the open state so as to bring the inter-piston chamber R3 and the opposing chamber R5 into communication with each other, thereby preventing the fluid pressure in the inter-piston chamber R3 from being decreased. Thus, the present hydraulic brake system prevents or reduces a change in the reaction force to the brake pedal 14 that is caused when the inter-piston chamber R3 and the opposing chamber R5 are brought into communication with each other, so as to reduce the unnatural feeling given to the driver.

(E) Control Program

Figure 6:
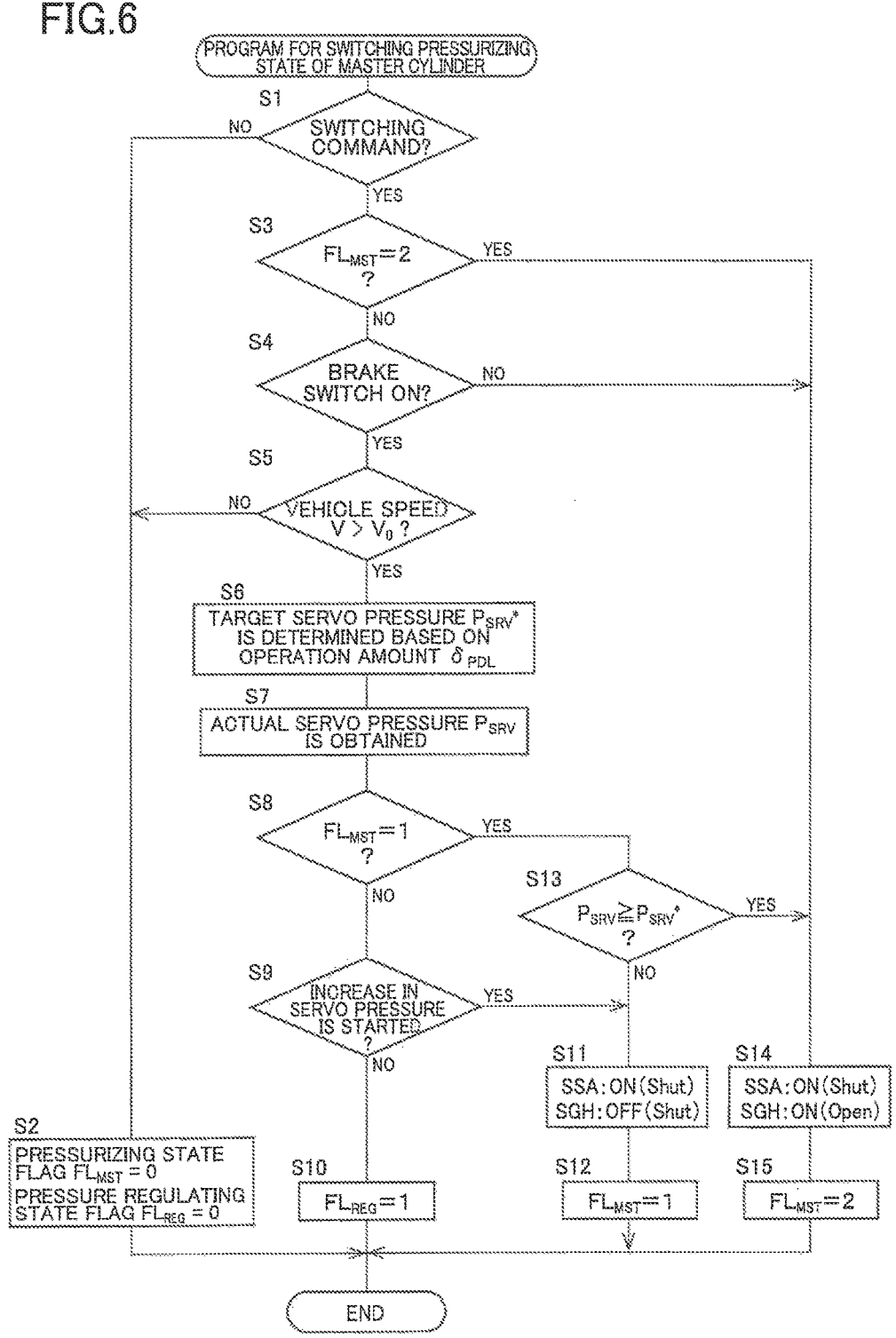
FIG. 6 shows a flowchart of a program for switching the pressurizing state of the master cylinder executed by the ECU shown in FIG. 1 as a controller.
Figure 7:
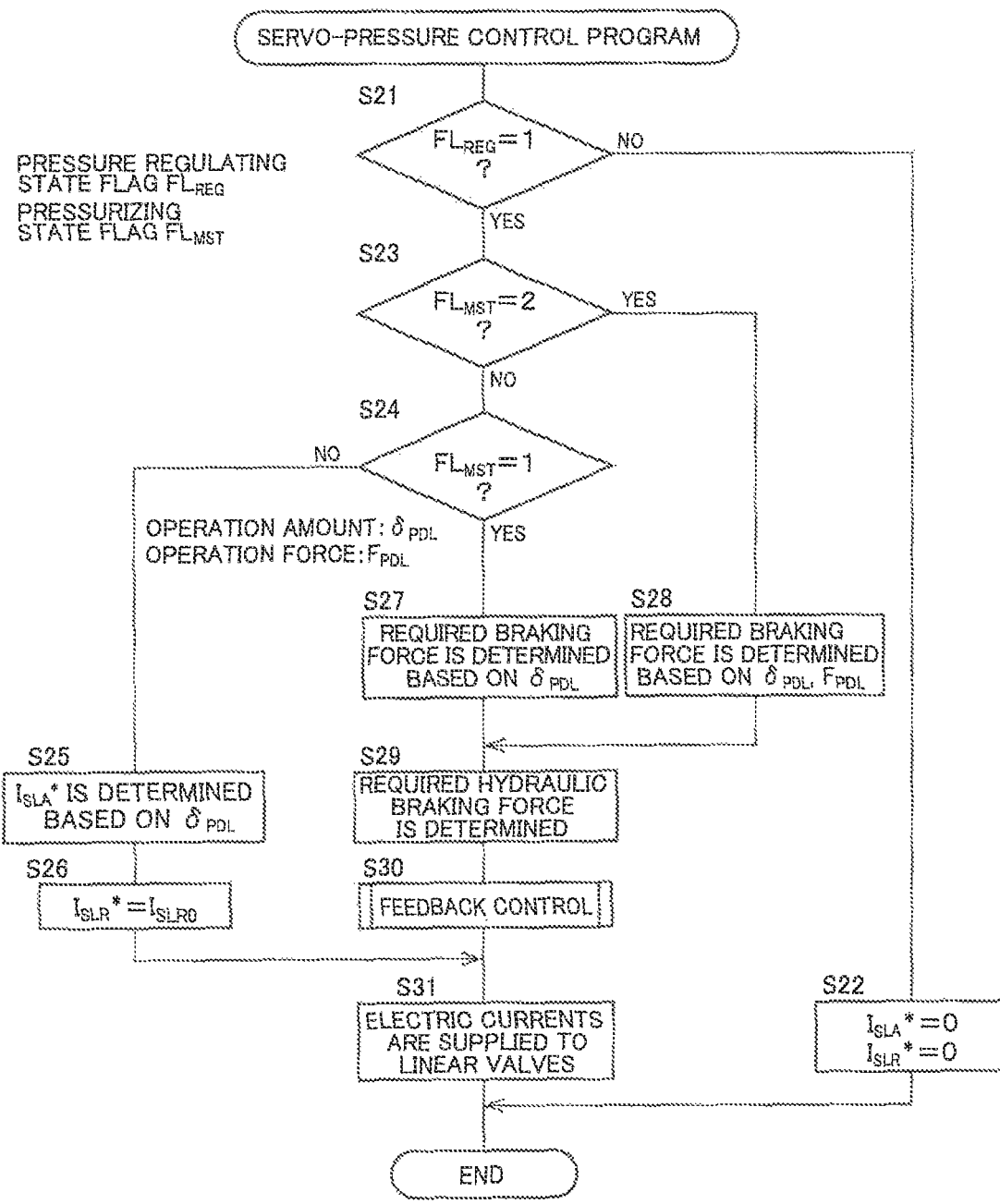
FIG. 7 shows a flowchart of a servo-pressure control program executed by the ECU shown in FIG. 1.

The hydraulic brake system of the present embodiment is controlled such that the ECU 30 carries out switching the state of the pressurizing state of the master cylinder 16, more specifically, switching of the communication switching valve 72 and the low-pressure-source shut-off valve 76 by executing a program for switching the pressurizing state of the master cylinder indicated by a flowchart of FIG. 6 and such that the ECU 30 controls the servo pressure $P_{SRV}$ by executing a servo-pressure control program indicated by a flowchart of FIG. 7. These programs are repeatedly executed at a short time pitch, e.g., from several microseconds (μsec) to several tens of microseconds (μsec), for instance.

These programs use a pressure regulating state flag $FL_{REG}$ indicative of the control state of the regulator 24 and a pressurizing state flag $FL_{MST}$ indicative of the pressurizing state of the master cylinder 16. A flag value of the pressure regulating state flag $FL_{REG}$ is 0 when the second pilot pressure $P_{PLT2}$ is not being controlled, changes to 1 when the second pilot pressure $P_{PLT2}$ starts to be increased, and changes to 2 when the feedback control starts. A flag value of the pressurizing state flag $FL_{MST}$ is 0 when the pressurizing state of the master cylinder 16 is the first pressurizing state, changes to 1 when the state of the low-pressure-source shut-off valve 76 is switched to the closed state, and changes to 2 when the state of the communication switching valve 72 is switched to the open state and the pressurizing state of the master cylinder 16 is switched to the second pressurizing state.

In the program for switching the pressurizing state of the master cylinder, step 1 (hereinafter "step" is abbreviated as "S") is initially implemented to determine whether the switching command for switching the state of the brake system from the first state to the second state is being issued. The brake system is kept in the first state until the switching command is issued. In this instance, S3 and subsequent steps are skipped, and the control flow goes to S2 at which the flag value of the pressure regulating state flag $FL_{REG}$ is set to 0 and the flag value of the pressurizing state flag $FL_{MST}$ is set to 0.

When the switching command is being issued, it is determined at S3 whether the master cylinder 16 is in the second pressurizing state based on whether the flag value of the pressurizing state flag $FL_{MST}$ is 2 or not and it is determined at S4 whether the brake operation is being made based on whether the brake switch 162 is in the ON position. When the flag value of the pressurizing state flag $FL_{MST}$ is 2, it means that the master cylinder is already in the second pressurizing state. In this case, the control flow goes to S14 at which the supply of electric current to each of the communication switching valve 72 and the low-pressure-source shut-off valve 76 is continued. When the brake switch 162 is in the OFF position though the flag value of the pressurizing state flag $FL_{MST}$ is not 2, the state of the master cylinder 16 is switched to the second pressurizing state because the pressurizing-state switching control need not be executed. That is, at S14, the supply of electric current to each of the communication switching valve 72 and the low-pressure-source shut-off valve 76 starts, and the flag value of the pressurizing state flag $FL_{MST}$ is changed to 2 at S15.

When the flag value of the pressurizing state flag $FL_{MST}$ is not 2 and the brake switch 162 is in the ON position, it is determined at S5 whether the brake operation to decrease the braking force has been made based on whether the vehicle speed V detected by the vehicle speed sensor 168 has exceeded the set value $V_0$. When the vehicle speed V is not higher than the set value $V_0$, the pressurizing-state switching control is not yet started, and S6 and subsequent steps are skipped. When the vehicle speed V exceeds the set value $V_0$, the control flow goes to S6 and subsequent steps to execute the pressurizing-state switching control.

The pressurizing-state switching control executed at S6 and subsequent steps will be explained. The target servo pressure $P_{SRV}*$ is determined at S6 based on the brake operation amount $\delta_{PDL}$ detected by the brake operation amount sensor 160. The actual servo pressure $P_{SRV}$ is obtained at S7 based on the detected value of the servo pressure sensor 152. It is subsequently determined at S8 whether the flag value of the pressurizing state flag $FL_{MST}$ is 1. When the flag value of the pressurizing state flag $FL_{MST}$ is not 1, namely, when the flag value is 0, it is determined at S9 whether the decrease in the servo pressure $P_{SRV}$ has stopped, based on whether the increase amount of the servo pressure $P_{SRV}$ (i.e., the increase amount as measured from the previous execution of the program) has become larger than the set value. When the decrease in the servo pressure $P_{SRV}$ does not yet stop, the flag value of the pressure regulating state flag $FL_{REG}$ is changed to 1 at S10, and one execution of the program for switching the pressurizing state of the master cylinder is completed.

When it is determined at S9 that the increase amount of the servo pressure $P_{SRV}$ has become larger than the set value, the control flow goes to S11 to start the supply of electric current to the low-pressure-source shut-off valve 76, and the low-pressure-source shut-off valve 76 is placed into the closed state. Subsequently, at 512, the flag value of the pressurizing state flag $FL_{MST}$ is changed to 1, and one execution of the program for switching the pressurizing state of the master cylinder is completed.

When it is determined at S8 that the flag value of the pressurizing state flag $FL_{MST}$ is 1, the control flow goes to S13 at which it is determined whether the actual servo pressure $P_{SRV}$ has become not lower than the target servo pressure $P_{SRV}*$. When the actual servo pressure $P_{SRV}$ does not yet reach the target servo pressure $P_{SRV}$ the supply of electric current only to the low-pressure-source shut-off valve 76 is continued at S11 and subsequent steps. On the other hand, when the actual servo pressure $P_{SRV}$ reaches the target servo pressure $P_{SRV}*$, the supply of electric current to the communication switching valve 72 is started at S14, and the master cylinder 16 is placed into the second pressurizing state. Subsequently, at S15, the flag value of the pressurizing state flag $FL_{MST}$ is changed to 2, and one execution of the program for switching the pressurizing state of the master cylinder is completed.

In the servo-pressure control program, the flag value of the pressure regulating state flag $FL_{REG}$ is confirmed at S21. When the flag value is 0, the control of the servo pressure $P_{SRV}$, namely, the control of the second pilot pressure $P_{PLT2}$, is not yet started, and the target supply current $I_{SLA}*$ of the pressure-increase linear valve 26 and the target supply current $I_{SLR}*$ of the pressure-decrease linear valve 28 are made equal to 0 at S22.

When it is confirmed at S21 that the flag value of the pressure regulating state flag $FL_{REG}$ is 1, the flag value of the pressurizing state flag $FL_{MST}$ is confirmed at S23 and S24. When the flag value of the pressurizing state flag $FL_{MST}$ is 0, the target supply current $I_{SLA}*$ of the pressure-increase linear valve 26 is determined at S25 based on the brake operation amount $\delta_{PDL}$, and the target supply current $I_{SLR}*$ of the pressure-decrease linear valve 28 is made equal to $I_{SLR0}$ at S26 which is set such that the valve 28 is not opened even when the second pilot pressure $P_{PLT2}$ is increased.

When the flag value of the pressurizing state flag $FL_{MST}$ is 1, the required braking force is determined at S27 based on the operation amount $\delta_{PDL}$. When the flag value of the pressurizing state flag $FL_{MST}$ is 2, the required braking force is determined at S28 based on the operation amount $\delta_{PDL}$ and the operation force $F_{PDL}$. Subsequently, at S29, the required hydraulic braking force is determined by subtracting the regenerative braking force from the determined required braking forces. At S30, the target supply current $I_{SLA}*$ of the pressure-increase linear valve 26 and the target supply current $I_{SLR}$ of the pressure-decrease linear valve 28 are determined by feedback control. At S31, the target supply current $I_{SLA}*$ is supplied to the pressure-increase linear valve 26, and the target supply current $I_{SLR}*$ is supplied to the pressure-decrease linear valve 28. Thus, execution of the servo-pressure control program is completed.

EXPLANATION OF REFERENCE SIGNS

10: wheel 12: brake device 14: brake pedal (brake operation member) 16: master cylinder 18: anti-lock unit [ABS] 20: reservoir (low-pressure source) 22: high-pressure-source device (high-pressure source) 24: regulator 26: pressure-increase linear valve [SLA] 28: pressure-decrease linear valve [SLR] 30: electronic brake control unit (controller)[ECU] 40: housing 42: first pressurizing piston 44: second pressurizing piston 46: input piston 48: stroke simulator 50: partition portion 56: flange 58: main body portion 60: protruding portion 70: communication passage 72: communication switching valve 74: low-pressure passage 76: low-pressure-source shut-off valve 86: reaction-force pressure sensor [$P_{RCT}$] 96: high-pressure-source pressure sensor [$P_{ACC}$] 100: housing 102: spool valve mechanism (valve mechanism) 104: pilot piston 110: spool (valve member) 112: spool holding sleeve 152: servo pressure sensor [$P_{SVR}$] 160: brake operation amount sensor [$\delta_{PDL}$] 162: brake switch [$SW_{BR}$] 164: door open/close switch [$SW_{DR}$] 166: ignition switch [$SW_{IG}$] 168: vehicle speed sensor [V] R1: first pressurizing chamber R2: second pressurizing chamber R3: inter-piston chamber R4: input chamber R5: opposing chamber R6: reaction-force chamber (inter-piston chamber & opposing chamber) R7: buffer chamber R8: first regulated-pressure chamber R9: first-pilot-pressure chamber R10: second-pilot-pressure chamber R11: second regulated-pressure chamber

The invention claimed is:

1. A hydraulic brake system, comprising:

a brake operation member to be operated by a driver;

a brake device provided for a wheel and configured to generate a braking force having a magnitude in accordance with a pressure of a working fluid supplied thereto;

a master cylinder including a housing including a partition portion which partitions an interior of the housing into two fluid chambers and which has an opening, an input piston disposed in the housing rearward of the partition portion and connected to the brake operation member to move forward toward the partition portion by an operation of the brake operation member, a pressurizing piston having a main body portion which is disposed in the housing forward of the partition portion and which has a flange formed at a rear end of the main body portion, an inter-piston chamber defined between the input piston and the pressurizing piston utilizing the opening of the partition portion, a pressurizing chamber which is defined forward of the pressurizing piston and in which the working fluid to be supplied to the brake device is pressurized by a forward movement of the pressurizing piston, an input chamber which is defined between the flange of the pressurizing piston and the partition portion and to which is introduced the working fluid for applying a force to the pressurizing piston that moves the pressurizing piston forward, and an opposing chamber defined forward of the flange of the pressurizing piston and opposed to the input chamber with the flange interposed therebetween, a pressure receiving area of the pressurizing piston on which a pressure of the working fluid in the inter-piston chamber acts being made equal to a pressure receiving area of the pressurizing piston on which a pressure of the working fluid in the opposing chamber acts;

a communication passage which connects the inter-piston chamber and the opposing chamber to each other and to which a low-pressure source is connected;

a communication switching valve disposed at a portion of the communication passage nearer to the inter-piston chamber than a connected portion of the communication passage at which the low-pressure source is connected, a state of the communication switching valve being switched between an open state in which communication between the inter-piston chamber and the opposing chamber is allowed and a closed state in which the communication is shut off;

a low-pressure-source shut-off valve disposed between the communication passage and the low-pressure source, a state of the low-pressure-source shut-off valve being switched between an open state in which communication between the communication passage and the low-pressure source is allowed and a closed state in which the communication is shut off;

a stroke simulator disposed at a portion of the communication passage nearer to the opposing chamber than the connected portion and including a fluid chamber connected to the communication passage, the stroke simulator being configured to elastically pressurize the working fluid in the fluid chamber;

a high-pressure source configured to supply the working fluid having a high pressure;

a regulator configured to regulate, to a regulated pressure, a pressure of the working fluid having the high pressure supplied from the high-pressure source and to supply the pressure-regulated working fluid to the input chamber of the master cylinder, the regulator including a regulated-pressure chamber in which the working fluid having the regulated pressure is stored, a valve mechanism including a valve member which is movable in an axial direction of the regulator and which is configured to receive the pressure of the working fluid in the regulated-pressure chamber from one-end side of the regulator in the axial direction, the valve mechanism being configured such that, when the valve member is located at an end position in a movable range of the valve member, the end position being located on-the an other-end side of the regulator in the axial direction, communication between the low-pressure source and the regulated-pressure chamber is allowed while communication between the high-pressure source and the regulated-pressure chamber is shut off and such that, when the valve member moves forward toward the one-end side of the regulator in the axial direction, the communication between the low-pressure source and the regulated-pressure chamber is shut off while the communication between the high-pressure source and the regulated-pressure chamber is allowed, a pilot piston disposed rearward of the valve member, a first-pilot-pressure chamber which is defined rearward of the pilot piston and to which is introduced the working fluid pressurized in the pressurizing chamber of the master cylinder, and a second-pilot-pressure chamber defined between the pilot piston and the valve member;

a pressure adjuster configured to adjust a pressure of the working fluid to a predetermined level and to supply the pressure-adjusted working fluid to the second-pilot-pressure chamber of the regulator; and a controller configured to control the communication switching valve and the low-pressure-source shut-off valve to switch the state of each of the communication switching valve and the low-pressure-source shut-off valve between the open state and the closed state and control the regulated pressure by controlling the pressure adjuster to adjust a second pilot pressure which is a pressure of the working fluid in the second-pilot-pressure chamber, wherein the controller is configured to control the pressure adjuster to adjust the second pilot pressure to switch a pressure-regulating state of the regulator from a first pressure-regulating state in which the pilot piston comes into contact with the valve member and moves with the valve member by a first pilot pressure which is a pressure of the working fluid in the first-pilot-pressure chamber, so that the regulated pressure is regulated to a level in accordance with the first pilot pressure to a second pressure-regulating state in which the valve member moves in a state in which the pilot piston is separated away from the valve member by the second pilot pressure, so that the regulated pressure is regulated to a level in accordance with the second pilot pressure, wherein the controller is configured to switch a pressurizing state of the master cylinder selectively between a first pressurizing state in which the pressurizing piston moves forward depending on both of a pressure of the working fluid in the inter-piston chamber and a pressure of the working fluid in the input chamber by shutting off the communication between the inter-piston chamber and the opposing chamber with the communication switching valve placed in the closed state and by allowing communication between the opposing chamber and the low-pressure source with the low-pressure-source shut-off valve placed in the open state and a second pressurizing state in which the pressurizing piston moves forward depending on only the pressure of the working fluid in the input chamber by allowing the communication between the inter-piston chamber and the opposing chamber with the communication switching valve placed in the open state and by shutting off communication between: the inter-piston chamber and the opposing chamber; and the low-pressure source with the low-pressure-source shut-off valve placed in the closed state, and wherein, when the pressurizing state of the master cylinder is switched from the first pressurizing state to the second pressurizing state after initiation of the operation of the brake operation member, the controller executes a pressurizing-state switching control in which switching of the state of the low-pressure-source shutoff valve from the open state to the closed state and switching of the state of the communication switching valve from the closed state to the open state are carried out after the pressure-regulating state of the regulator has been switched from the first pressure-regulating state to the second pressure-regulating state by controlling the pressure adjuster to increase the second pilot pressure before switching from the first pressurizing state to the second pressurizing state.

2. The hydraulic brake system according to claim 1, wherein the controller executes the pressurizing-state switching control such that the switching of the state of the low-pressure-source shut-off valve from the open state to the closed state is carried out after the pressure-regulating state of the regulator has been switched from the first pressure-regulating state to the second pressure-regulating state and thereafter the switching of the state of the communication switching valve from the closed state to the open state is carried out.

3. The hydraulic brake system according to claim 1, wherein the controller executes the pressurizing-state switching control such that, in an instance where the regulated pressure is decreased by a movement of the valve member toward the other-end side of the regulator based on a relationship of a force that acts on the valve member after the pilot piston has been separated away from the valve member by the increased second pilot pressure and the pressure of working fluid in the input chamber is accordingly decreased, the switching of the low-pressure-source shut-off valve from the open state to the closed state is carried out on the condition that the decrease of the fluid pressure in the input chamber stops.

4. The hydraulic brake system according to claim 1,
wherein the controller is configured such that, when the pressurizing state of the master cylinder is switched to the second pressurizing state, the second pilot pressure is feedback controlled based on a difference between an actual fluid pressure in the input chamber and a target fluid pressure in the input chamber determined in accordance with the operation of the brake operation member, and
wherein the controller executes the pressurizing-state switching control such that the switching of the state of the communication switching valve from the closed state to the open state is carried out on the condition that the actual fluid pressure in the input chamber reaches the target fluid pressure.

5. The hydraulic brake system according to claim 1 wherein, when an operation to decrease the braking force has been made on the brake operation member, the controller starts to increase the second pilot pressure by controlling the pressure adjuster while the first pressurizing state is maintained, to start execution of the pressurizing-state switching control.

6. The hydraulic brake system according to claim 1, wherein the regulator is constructed such that a pressure receiving area of the valve member at which the second pilot pressure is received from a rear side is made smaller than a pressure receiving area of the pilot piston at which the second pilot pressure is received from a front side.

* * * * *